US008498479B2

(12) United States Patent
Saito

(10) Patent No.: US 8,498,479 B2
(45) Date of Patent: Jul. 30, 2013

(54) IMAGE PROCESSING DEVICE FOR DIVIDING AN IMAGE INTO A PLURALITY OF REGIONS

(75) Inventor: Toru Saito, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 827 days.

(21) Appl. No.: 12/659,115

(22) Filed: Feb. 25, 2010

(65) Prior Publication Data

US 2010/0246896 A1  Sep. 30, 2010

(30) Foreign Application Priority Data

Mar. 24, 2009  (JP) ................................. 2009-072148

(51) Int. Cl.
   *G06K 9/00* (2006.01)
(52) U.S. Cl.
   USPC .......................................... 382/173; 382/106
(58) Field of Classification Search
   USPC ........................................ 382/106, 173, 100
   See application file for complete search history.

(56) References Cited

U.S. PATENT DOCUMENTS

| 6,731,792 | B1 | 5/2004 | Tanaka |
| 7,813,553 | B2 * | 10/2010 | Suzuki et al. ................. 382/190 |
| 8,055,067 | B2 * | 11/2011 | Petrescu et al. ............... 382/164 |
| 8,224,031 | B2 * | 7/2012 | Saito ............................ 382/104 |
| 2006/0239509 | A1 | 10/2006 | Saito |
| 2008/0123959 | A1 * | 5/2008 | Ratner et al. .................. 382/173 |
| 2008/0170784 | A1 * | 7/2008 | Guerzhoy et al. ............ 382/173 |

FOREIGN PATENT DOCUMENTS

JP    2006-72495    3/2006

* cited by examiner

*Primary Examiner* — Shefali Goradia
(74) *Attorney, Agent, or Firm* — McGinn IP Law Group, PLLC

(57) ABSTRACT

An image processing device for dividing an image imaged by imaging means into multiple regions includes: processing means for grouping, when difference of the pieces of image data between a single pixel within the image and a pixel adjacent thereto is less than a predetermined threshold, the single pixel and the adjacent pixel, and dividing the image into multiple regions with finally obtained each group as each region of the image; and average-value calculating means for calculating the average value of the image data within the group including the single pixel; with the processing means comparing the image data of the single pixel, and the average value calculated at the average-value calculating means regarding the group to which the adjacent pixel belongs; and when the difference thereof is equal to or greater than a predetermined second threshold, doing not group the single pixel and the adjacent pixel.

13 Claims, 14 Drawing Sheets

T r T

IMAGE PROCESSING DEVICE FOR DIVIDING AN IMAGE INTO A PLURALITY OF REGIONS

CROSS REFERENCES TO RELATED APPLICATIONS

The disclosure of Japanese Patent Application No. 2009-072148 filed on Mar. 24, 2009 including the specification, drawings and abstract is incorporated herein by reference in its entirety.

BACKGROUND OF THE INVENTION

1. Field of the Invention

The present invention relates to an image processing device, and specifically relates to an image processing device which divides an image into multiple regions according to an imaged object.

2. Description of the Related Art

Heretofore, a technique has been known wherein an image is simplified by grouping pixels having image data such as similar luminance or the like, as a technique for extracting an imaged object such as an object or the like from out of an image that has been imaged with, for example, a CCD (Charge Coupled Device) camera, a CMOS (Complementary Metal Oxide Semiconductor) camera, or the like, an image compressing technique for image search or the like, or a technique for calculating a feature quantity within an image.

For example, with a color image region dividing method disclosed in Japanese Unexamined Patent Application Publication No. 2000-67240, a hue value (H), a luminance value (L), and a saturation value (S) are obtained from the image data of each pixel represented with RGB values, and for example, hue difference, luminance difference, and saturation difference between a right pixel and a lower pixel are each calculated for each pixel, each average value of hue difference, luminance difference, and saturation difference of all pixels is calculated, and HLS color space is divided with each average value as the division width in each axial direction of HLS color space.

Subsequently, a color classification number is appended to color space divided regions of HLS color space, each pixel is labeled with a color classification number based on the color of each pixel (H, L, S), a pixel group having the same color classification number on an image is grouped to obtain on region, thereby dividing the image into regions. With the color image region dividing method disclosed in Japanese Unexamined Patent Application Publication No. 2000-67240, further, the color information and texture information of the whole image, the sizes of divided regions, color information, the shape of a border line, and the like are extracted from the information of each group divided into regions, image data belonging to a group, and the like as feature quantities.

SUMMARY OF THE INVENTION

Incidentally, such as the image region dividing method disclosed in Japanese Unexamined Patent Application Publication No. 2000-67240, in the case that HLS color space or the like is divided based on the average value of hue difference of each pixel, and grouping of each pixel is executed based on a color classification number or the like appended to each divided region such as color space or the like, for example, even in the event that each pixel belongs to the same imaged object imaged within an image, and the image data thereof such as color, luminance, or the like somewhat mutually differs, when color classification numbers labeled on pixels differs, these pixels are integrated into a different group. Therefore, there is caused a problem wherein each pixel belonging to the same imaged object is not readily integrated into the same group.

Also, conversely, in the case that two pixels belonging to a mutually different imaged object are adjacent to each other on a border portion where multiple imaged objects are imaged within an image, when color classification numbers labeled on these pixels are the same, these pixels are integrated into the same group. Therefore, there is also caused a problem wherein each pixel belonging to a different imaged object is not readily integrated into a different group, and the imaged objects are not readily extracted separately.

This is a problem that is not restricted to the case of the technique disclosed in Japanese Unexamined Patent Application Publication No. 2000-67240, for example, may occur even in the case that image data approximate to the same discrete information by approximating the image data of each pixel with finite pieces of discrete information and quantizing this at image information compression processing is integrated into the same group. Thus, in the event of attempting to classify the image data of each pixel in accordance with a uniformly predetermined classification method to execute grouping, for example, precise grouping may not necessarily be executed wherein, with each imaged object imaged within an image, imaged objects such as the same object and the like are integrated into one group, and different imaged objects are integrated into a mutually different group.

Also, for example, with image information compression processing or the like, for example, the image data of 256 luminance gradations of each pixel imaged within a monochrome image, or the image data of 256 (R)×256 (G)×256 (B)=16,777,216 types of image data of each pixel imaged within a color image is compressed to, for example, several types or tens of types of data to execute processing, the information amount of the image data markedly deteriorates. Therefore, the abundance of information that the image data has may not be used effectively.

Further, in the case that grouping processing is executed such as the image region dividing method disclosed in Japanese Unexamined Patent Application Publication No. 2000-67240, the processing is executed only after the image data of all pixels for one image are captured, and accordingly, the processing takes time, and for example, in the case that the image data of several frames worth or tens of frames worth of image is captured for one second, and has to be processed rapidly, the processing may not be completed in time. Consequently, the real-time nature of image processing may be impaired.

The present invention has been made in the light of such a situation, and it is an object of the present invention to provide an image processing device whereby imaged objects to be integrated into one group such as objects imaged within an image can be accurately grouped using the information amount of image data effectively. Also, it is another object of the present invention to provide an image processing device whereby this grouping can be executed in real-time.

In order to solve the above problem, according to an aspect of the present invention, an image processing device configured to divide an image imaged by imaging means into multiple regions includes: processing means configured to group, in the case that difference of the pieces of image data between a single pixel within the image and a pixel adjacent thereto is less than a predetermined first threshold, the single pixel and the adjacent pixel, and to divide the image into a plurality of regions with finally obtained each group as each region of the image; and average-value calculating means configured to calculate the average value of the image data within the group including the single pixel; with the processing means comparing the image data of the single pixel, and the average value calculated at the average-value calculating means regarding the group to which the adjacent pixel belongs, and in the case that the difference thereof is equal to or greater than a predetermined second threshold, doing not group the single pixel and the adjacent pixel.

According to this configuration, determination is made whether or not a single pixel and a pixel adjacent thereto are grouped based on not only difference between the image data of a single pixel (pixel of interest) and the image data of a pixel adjacent thereto (edge intensity) but also difference between the image data of a single pixel, and the average value of the image data of each pixel of a group to which a pixel adjacent thereto belongs (average value difference) effectively using rich information amount without subjecting to image data to compression processing or the like.

Therefore, an image may be divided into multiple regions accurately so that a pixel of an imaged object (e.g., a single object) to be integrated as one group imaged within an image is accurately grouped, and a pixel of an imaged object (e.g., a different object) not to be integrated as one group is not grouped, by effectively using the information amount of image data. Accordingly, an imaged object can accurately be separated and extracted from out of an image.

With the processing means, upon the image data of the single pixel being transmitted from the imaging means, the image data of a pixel adjacent to the single pixel that is a pixel transmitted prior to the single pixel, of the same image as the single pixel, may be compared with the image data of the single pixel, with the image data of the single pixel also being compared with the average value of the group to which the adjacent pixel of which the image data was transmitted prior to the single pixel belongs.

According to this configuration, in addition to the above-described advantages, an arrangement is made wherein in the case that the image data of each pixel is sequentially input from the imaging means to the processing means, each process is carried out simultaneously in parallel with input of image data, and a single pixel and image data that has been input prior thereto are compared, whereby processing can be executed without awaiting input of the image data of all pixels for one image, and accordingly, grouping processing can be executed in real-time.

With the processing means, in the case that either of the pieces of image data of adjacent the pixels are within a predetermined numeric value range, the adjacent pixels of which the image data is within the numeric value range may be grouped preferentially regardless of comparison of the pieces of image data between the single pixel and the adjacent pixels, and comparison between the image data of the single pixel and the average value of the group.

According to this configuration, a region within a predetermined numeric value range where image data is included can accurately be separated and extracted from other regions within an image. Therefore, in the case that an imaged object is imaged as image data of a numeric value range peculiar thereto, such as a region within an image imaged with high luminance like a light source such as a lighting signal light on a traffic light, taillights of a vehicle in front, or the like, or a region within image T imaged with low luminance such as a tunnel or the like, in the case that an imaged object is imaged as image data in a luminance range peculiar thereto, a region where the image data is included in a particular numeric value range can be extracted preferentially from out of the image, and an imaged object thereof can accurately be extracted, and accordingly, the above-described advantages are exhibited more effectively.

With the processing means, in the case that, of the pieces of image data adjacent the pixels, one piece of image data is within a predetermined numeric value range, and the other piece of image data is out of the numeric value range, the adjacent pixels may not be grouped regardless of comparison of the pieces of image data between the single pixel and the adjacent pixels, and comparison between the image data of the single pixel and the average value of the group.

According to this configuration, in the case that an imaged object is imaged as image data in a particular numeric value range, the image data of one of a single pixel and a pixel adjacent thereto is in the above numeric value range, and the image data of the other is out of the numeric value range, the adjacent pixels are not grouped, whereby only a pixel within a predetermined numeric value range can accurately be grouped, and a region where image data is in a predetermined numeric value region can accurately be separated and extracted from other regions. Therefore, an imaged object where image data in a particular numeric value range is imaged can accurately be extracted, and the above-described advantages are exhibited more effectively.

With the processing means, in the case that the minimum value of pixel intervals of two the groups that are not adjacent to each other on an image is equal to or smaller than a predetermined threshold, and also difference of the average values of these two groups is equal to or smaller than a predetermined threshold, these two groups may be integrated into a single group.

According to this configuration, in the case that a region to be extracted as a single region corresponding to a single imaged object imaged within an image is divided into multiple regions due to noise or the like, the divided multiple regions can be integrated into the original single region by eliminating influence such as noise or the like, and the above-described advantages are exhibited more exactly.

The imaging means configured to output a pair of images, may include: distance detecting means configured to subject the pair of images output from the imaging means to stereo matching processing to detect distance on real space corresponding to at least a pixel of one image of the pair of images; wherein, with the processing means, in the case that difference between the distance on real space corresponding to the single pixel within the one image, and the distance on real space corresponding to a pixel adjacent to the single pixel is equal to or greater than a predetermined threshold, the single pixel and the adjacent pixel being not grouped.

According to this configuration, in addition to the above-described configurations, even in the event that the pieces of image data of adjacent pixels approximate to each other and can be grouped, in the case that each distance on real space of adjacent pixels calculated for each pixel of an image by subjecting a pair of images imaged by a stereo camera to stereo matching processing is separated so as not to be regarded as the same imaged object, the adjacent pixels are not grouped, whereby pixels that are not pixels corresponding to the same imaged object can be prevented from being grouped, and an imaged object can accurately be separated and extracted from out of an image by distinguishing the position of the imaged object on real space.

The processing means may determine whether or not difference between the distance on real space closest to the distance on real space corresponding to the single pixel of the distance on real space corresponding to each pixel belonging to the group to which the adjacent pixel belongs, and the distance on real space corresponding to the single pixel is equal to or greater than the threshold.

According to this configuration, in the case that the information of distance on real space corresponding to a pixel adjacent to a single pixel has not been calculated, or the like, of distance on real space corresponding to the single pixel, and each distance on real space corresponding to each pixel belonging to a group to which the adjacent pixel belongs, difference with distance on real space closet to the distance on real space corresponding to the single pixel is calculated, and determination processing is executed based thereon, and accordingly, the advantages of the preceding configuration can be exhibited more exactly.

The processing means may calculate the coordinates of each point on real space corresponding to the each pixel based on the each distance on real space corresponding to each pixel belonging to the group that the adjacent pixel belongs, calculate the inclination of the distribution of the each point, and determine whether or not difference between distance on real space corresponding to the adjacent pixel estimated from the inclination, and the distance on real space corresponding to the single pixel is equal to or greater than the threshold.

According to this configuration, inclination of the distribution of each point on real space corresponding to each pixel belonging to a group to which an adjacent pixel belongs is calculated, such as inclination in the distance direction as to the height direction, inclination in the distance direction as to the horizontal direction, or the like, and based thereon the distance on real space corresponding to this adjacent pixel is estimated, and difference between this and the distance on real space corresponding to a single pixel is calculated, whereby determination processing can be executed exactly even in the event that the information of distance on real space as to the pixel adjacent to the single pixel has not been calculated, and accordingly, the above-described advantages can be exhibited more exactly.

The average-value calculating means may calculate one of the average value, the maximum value, and the minimum value of the each distance on real space corresponding to each pixel belonging to the group; with the processing means comparing one of the average value, the maximum value, and the minimum value of the distance on real space calculated at the average-value calculating means regarding the group to which the adjacent pixel belongs with the distance on real space corresponding to the single pixel, and in the case that the difference thereof is equal to or greater than a predetermined threshold, doing not group the single pixel and the adjacent pixel.

According to this configuration, in addition to the above-described advantages, an arrangement is made wherein when the average value or the like of the image data of each pixel belonging to a group including a single pixel is calculated at the average-value calculating means, at the same time, the distance on real space corresponding to the single pixel is calculated, and the average value, the maximum value, and the minimum value of each distance on real space corresponding to each pixel belonging to the group are calculated, whereby calculation load at the processing means can be reduced. Also, determination processing regarding whether or not a single pixel and a pixel adjacent thereto are grouped at the processing means is executed using the average value, the maximum value, and the minimum value of each distance on real space corresponding to each pixel belonging to the group calculated by the average-value calculating means, whereby the processing can be executed rapidly, and also the determination processing can be executed more exactly.

The image processing device may further include: road surface detecting means configured to detect a road surface from an image imaged by the imaging means; with the processing means calculating the height of each point on real space corresponding to the each pixel based on the each distance on real space corresponding to each pixel belonging to the group, and in the case that the height of the each point from the road surface that the road surface detecting means detected is equal to or higher than a predetermined threshold, recognizing the group as a solid object existing on a road surface, and in the case that the height of the each point from the road surface that the road surface detecting means detected is lower than the predetermined threshold, recognizing the group as a pattern indicated on a road surface.

According to this configuration, in addition to the aforementioned advantages, with the road surface detecting means, a road surface is detected, a group of which the height on real space is higher than the road surface by a predetermined threshold or higher with the road surface as a reference is recognized as a solid object existing on the road surface, and a group of which the height is lower than a predetermined threshold is recognized as a pattern indicated on the road surface, whereby an imaged object that is the solid object, and an imaged object that is the pattern indicated on the road surface can be divided into different regions, and can accurately be distinguished and extracted.

With the processing means, in the case that of height from the road surface on a point on real space corresponding to the single pixel, and height from the road surface of the each point on real space corresponding to each pixel belonging to the group to which the adjacent pixel belongs, and one height is lower than the predetermined threshold, and also the other height is equal to or higher the predetermined threshold, the single pixel and the adjacent pixel may not be grouped.

According to this configuration, a pixel or group recognized as a solid object, a pixel or group recognized as a pattern indicated on a road surface are prevented from being grouped, and accordingly, an imaged object that is a solid object, and an imaged object that is a pattern indicated on a road surface can be divided into different regions and can accurately be distinguished and extracted, and accordingly, the advantage of the preceding configuration can be exhibited more exactly.

With the processing means, in the case that, with two distributions of each point on real space corresponding to each pixel belonging to the two groups that are not adjacent to each other on an image, and the minimum value of the interval of two points on real space belonging to a different distribution is equal to or smaller than a predetermined threshold, and also in the case that the maximum value is equal to or smaller than a predetermined threshold that is a greater value than the threshold, these two groups may be integrated into a single group.

According to this configuration, when grouping each pixel corresponding to an imaged object of which the size on real space has already been known, in the case that a region to be extracted as a single region corresponding to this imaged object imaged within an image is divided into multiple regions due to noise or the like, influence such as noise or the like can be eliminated, and the divided multiple regions can be integrated into the original single region, and accordingly, the advantages of the above configurations can be exhibited more exactly.

With the processing means, in the case that, of the two groups that are not adjacent to each other on an image, height from the road surface of the each point on real space corresponding to each pixel belonging to one of the groups is equal to or greater than the predetermined threshold, and also in the case that height from the road surface of the each point on real space corresponding to each pixel belonging to the other of the groups is lower than the predetermined threshold, these two groups may not be integrated.

According to this configuration, when integrating two groups that are not adjacent to each other on an image in the configuration described before, in the case that one of the groups is recognized as an imaged object that is a solid object, and the other group is recognized as a pattern indicated on a road surface, these two groups are not integrated, whereby the solid object and the pattern indicated on the road surface can accurately be separated and extracted, and accordingly, the advantage of the preceding configuration can be exhibited more exactly.

BRIEF DESCRIPTION OF THE DRAWINGS

FIG. 19A is a horizontal-shaped model on a Z-X plane, and FIG. 19B represents a road-height model on a Z-Y plane;

DESCRIPTION OF THE PREFERRED EMBODIMENTS

Embodiments of an image processing device according to the present invention will be described below with reference to the drawings.

First Embodiment

Figure 1:
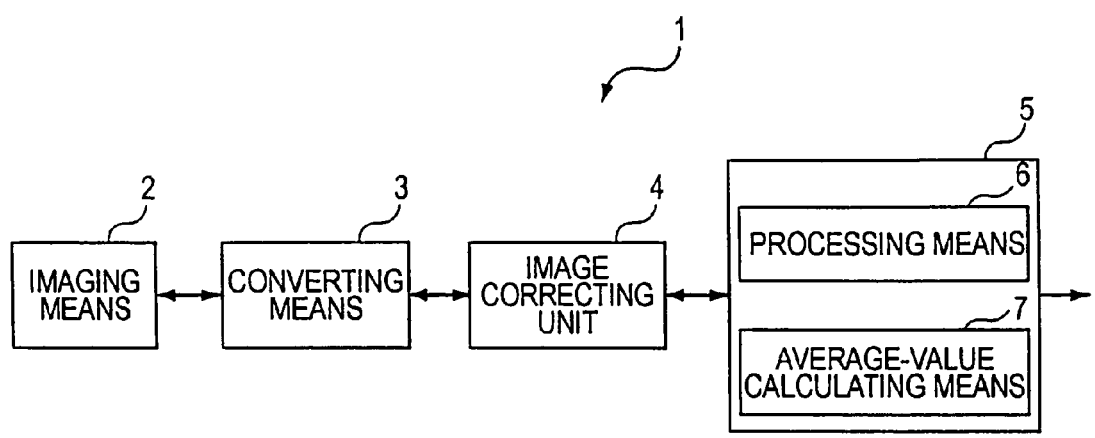
FIG. 1 is a block diagram illustrating the configuration of an image processing device according to a first embodiment.

An image processing device 1 according to a first embodiment is principally configured of, such as shown in FIG. 1, imaging means 2 and a processing unit 5. With regard to the imaging means 2, with the present embodiment, for example, monocular imaging means such as a camera or the like in which an image sensor such as a CCD or CMOS sensor or the like is housed are used, but an arrangement may be made wherein a single image or multiple images are subjected to processing according to the present invention imaged by single or multiple imaging means of multiple provided imaging means.

Note that, with the present embodiment, monochrome image data D is obtained by each unshown imaging device making up the imaging means 2, and one imaging device corresponds to one pixel within an image. Also, with the present embodiment, as described later, description will be made regarding a case where each piece of image data D imaged for each imaging device (i.e., each pixel) of the imaging means 2 is converted into each piece of image data D that is a digital value serving as the luminance of 256-gradation grayscale at converting means 3, for example. However, the present invention is not restricted to this, and the present invention may be applied to, for example, a case where color image data represented with RGB values or the like is imaged at each imaging device of the imaging means 2.

Figure 2:
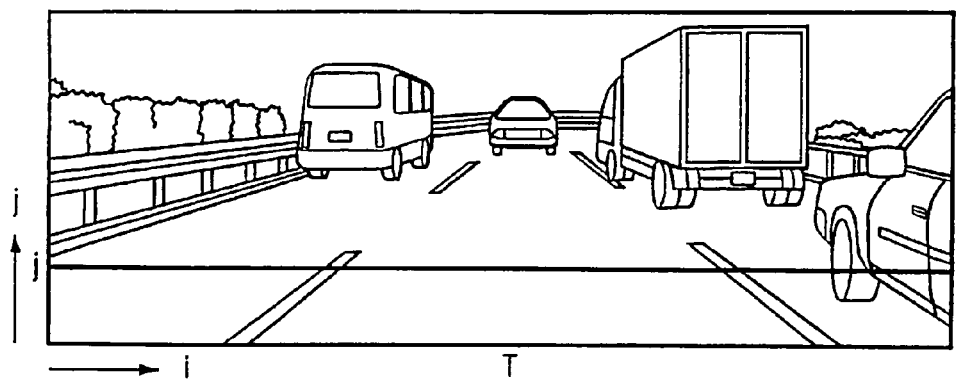
FIG. 2 is a diagram illustrating an example of an image imaged at imaging means.

Also, with the present embodiment, for example, in the case of imaging an image T such as shown in FIG. 2, the imaging means 2 execute imaging by sequentially scanning from the imaging device on the leftmost side of each horizontal line j of the image T in the right direction while sequentially switching the horizontal line j to be scanned upwards from the lowermost line, and sequentially transmit each piece of the image data D to the converting means 3 in the order imaged at each imaging device.

The converting means 3 are configured of an analog digital converter. Upon each piece of the image data D imaged for each imaging device (each pixel) at the imaging means 2 being sequentially transmitted, the converting means 3 convert each piece of the image data D into each piece of image data D that is a digital value, and output this to an image correcting unit 4. The image correcting unit 4 sequentially subjects each piece of the transmitted image data D to image correction such as removal of deviation or noise, correction of luminance, or the like, and sequentially transmits each piece of the image data D subjected to image correction to the processing unit 5.

The processing unit 5 is configured of, with the present embodiment, a computer in which unshown CPU (Central Processing Unit), ROM (Read Only Memory), RAM (Random Access Memory), input/output interface, and the like are connected to a bus. The processing unit 5 includes processing means 6 and average-value calculating means 7, but further may be configured so as to execute other processing.

With the present embodiment, upon the image data D of each imaging device (each pixel) being sequentially transmitted such as described above, the processing means 6 compare each piece of the image data D between adjacent pixels, and also compare the image data D of a single pixel, and the average value calculated at the average-value calculating means 7 regarding each piece of the image data D of each pixel belonging to a group to which an adjacent pixel belongs such as described later, thereby determining whether to group these adjacent pixels.

Subsequently, the processing means 6 thus group adjacent pixels that can be grouped with the image T, and at the time of ending the processing regarding all pixels of the image T, take each of the groups finally obtained as each region of the image T, thereby dividing the image T into multiple regions.

The processing at the processing unit 5 including the processing means 6 and the average-value calculating means 7 will be described below in accordance with the flowchart shown in FIGS. 3 and 4.

Note that, with the present embodiment, as described above, the image data D of each imaging device (each pixel) is sequentially output from the imaging means 2, subjected to processing at each of the converting means 3 and the image correcting unit 4, and each piece of the processed image data D is sequentially transmitted to the processing unit 5, but the following processing is executed at the processing unit 5 in parallel at the same time as each piece of the image data D being sequentially input thereto. Thus arranged, the image data can be processed without awaiting input of the image data D of all pixels for one image, and accordingly, grouping processing can be executed in real-time.

Also, with the following description, for example, a pixel in the image T shown in FIG. 2 is represented as "pixel pi, j" with the pixel at the left lower corner of the image T as the origin using pixel coordinates (i, j) in the case of taking i axis in the right direction, and j axis in the upper direction. Also, the image data D of the pixel pi, j is represented as "Di, j".

With the processing at the processing unit 5, first, upon imaging being started by the imaging means 2 (step S1 in FIG. 3), the processing means 6 set each of the values of i and j to 0 (step S2). As described above, upon input to the processing unit 5 of image data D0, 0 of a left-edge pixel p0, 0 (i.e., the pixel of the origin) on a horizontal line 0 (i.e., a horizontal line j made up of each pixel of which the j coordinate is 0) imaged at the imaging means 2 being started (step S3), subsequently the image data D1, 0, D2, 0, D3, 0, and so on of pixels p1, 0, p2, 0, p3, 0, and so on are sequentially input.

Subsequently, in the event that the processing up to the right-edge pixel of the horizontal line j has not been completed (NO in step S4), the processing means 6 increment the i coordinate by one (step S5), and continue the processing while moving a single pixel of interest (hereafter, referred to as "pixel of interest") to a right adjacent pixel on the horizontal line j (step S6).

Also, upon completing the processing up to the right-edge pixel on the horizontal line j (YES in step S4), in the event that the processing up to the horizontal line of the uppermost stage of the image T has not been completed (NO in step S7), the processing means 6 move the horizontal line j to be processed to a horizontal line j+1 that is one row above thereof, set the i coordinate of the pixel of interest to 0 (step S8), execute the processing with a pixel p0, j+1 as the pixel of interest (step S6), and continue the processing while moving the pixel of interest to the right side in order from the pixel p0, j+1.

Next, the processing at the processing means 6 (step S9 and so on in FIG. 4) after the pixel of interest is set to the pixel pi, j (step S6) will be described.

Figure 5:
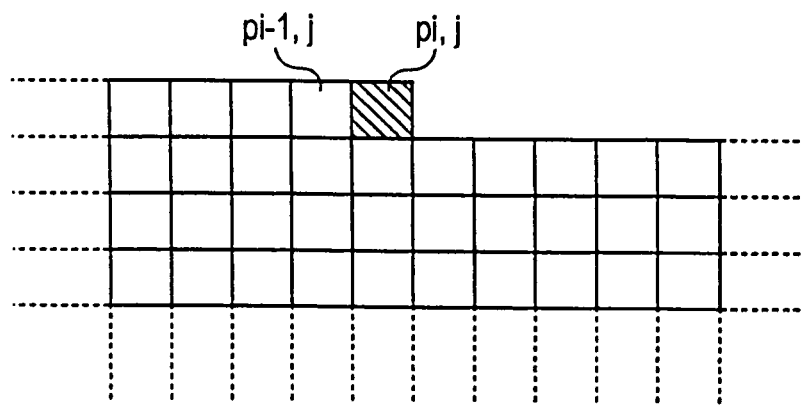
FIG. 5 is a diagram for describing an input single pixel, and a pixel, which has already been input, adjacent to the left thereof.

The processing means 6 first determine whether or not the following conditions 1 and 2 are satisfied regarding the pixel of interest pi, j, and a pixel pi−1, j adjacent to the left of the pixel of interest pi, j, which has been input before the pixel of interest pi, j is input, such as shown in FIG. 5 (step S9).

Condition 1: Difference $\Delta D\text{left}(i, j)$ between the image data $D_{i,j}$ of the pixel of interest pi, j, and the image data $D_{i-1,j}$ of the pixel pi−1, j adjacent to the left thereof, i.e., $$\Delta D\text{left}(i, j) = |D_{i,j} - D_{i-1,j}| \qquad (1)$$

is less than a predetermined first threshold $\Delta D\text{th}$. Note that difference $\Delta D$ of the image data D between such adjacent pixels will be referred to as edge intensity.

Figure 6:
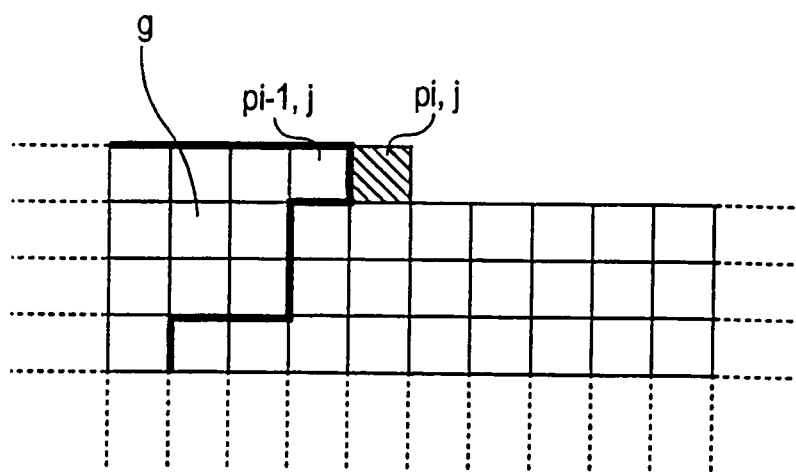
FIG. 6 is a diagram for describing an example of a group to which a single pixel and a pixel adjacent to the left thereof belong.

Condition 2: As shown in FIG. 6, difference $\delta D\text{left}(i, j)$ between the image data $D_{i,j}$ of the pixel of interest pi, j, and the average value Dave-left of the image data D of each pixel belonging to a group g to which the pixel pi−1, j adjacent to the left thereof belongs, i.e., $$\delta D\text{left}(i, j) = |D_{i,j} - D\text{ave-left}| \qquad (2)$$

is less than a predetermined second threshold $\delta D\text{th}$.

Note that, as described above, hereafter, difference $\delta D$ between the image data $D_{i,j}$ of the pixel of interest pi, j, and the average value Dave of the image data D of the group g to which the adjacent pixel belongs will be referred to as average-value difference. Also, the average value Dave of the image data D of each pixel belonging to the group g is, such as described later, calculated at the average-value calculating means 7 (see step S16). Further, there is also a case where the group g to which the left-adjacent pixel pi−1, j belongs is made up of this left-adjacent pixel pi−1, j alone, and in this case, the average value Dave-left of the image data D of each pixel belonging to the group g is equal to the image data Di−1, j of this left-adjacent pixel pi−1, j.

In the case of determining that both of the conditions 1 and 2 are satisfied (YES in step S9), the processing means 6 proceed to determination processing in step S10, and in the case of determining that at least one of the conditions 1 and 2 is not satisfied (NO in step S9), proceeds to determination processing in step S13. Note that the above first threshold $\Delta D\text{th}$ and the second threshold $\delta D\text{th}$ may be set to the same value or a different value, and accordingly, the values of these thresholds are set as appropriate.

Figure 7:
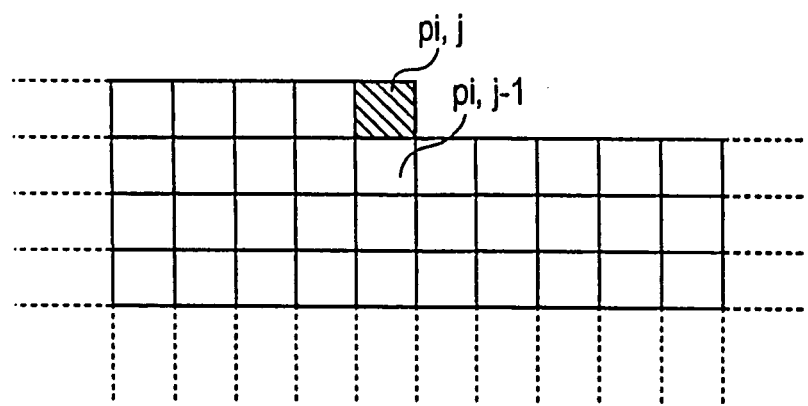
FIG. 7 is a diagram for describing an input single pixel, and a pixel, which has already been input, adjacent to the underneath thereof.

Upon determination being made in the determination processing in step S9 that both of the conditions 1 and 2 are satisfied (YES in step S9), subsequently the processing means 6 determine, in the same way as the above, whether or not the following conditions 3 and 4 are satisfied regarding the pixel of interest pi, j, and a pixel pi, j−1 adjacent to the underneath of the pixel of interest pi, j, which has been input before the pixel of interest pi, j is input such as shown in FIG. 7 (step S10).

Condition 3: Edge intensity $\Delta D\text{lower}(i, j)$ between the image data $D_{i,j}$ of the pixel of interest pi, j, and the image data $D_{i,j-1}$ of the pixel pi, j−1 adjacent to the underneath thereof, i.e., $$\Delta D\text{lower}(i, j) = |D_{i,j} - D_{i,j-1}| \qquad (3)$$

is less than the above predetermined first threshold ΔDth.

Figure 8:
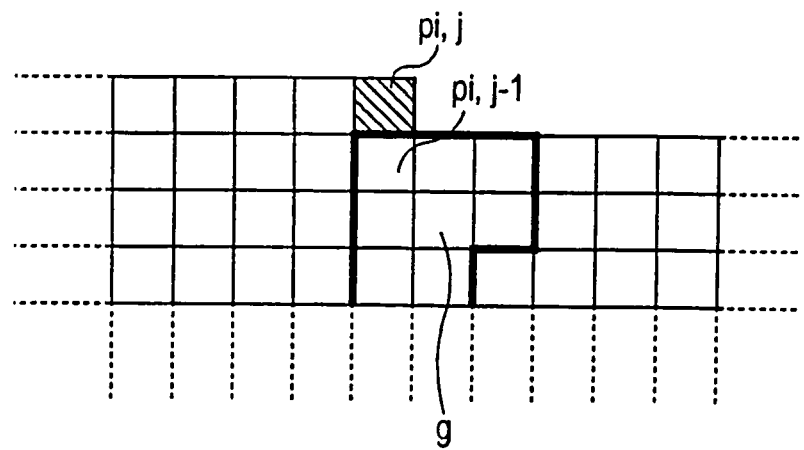
FIG. 8 is a diagram for describing an example of a group to which a single pixel and a pixel adjacent to the underneath thereof belong.

Condition 4: As shown in FIG. 8, average-value difference δDlower(i, j) between the image data Di, j of the pixel of interest pi, j, and the average value Dave-lower of the image data D of each pixel belonging to the group g to which the pixel pi, j−1 adjacent to the underneath thereof belongs, i.e., $$\delta Dlower(i, j) = |Di, j - Dave-lower| \quad (4)$$

is less than the above predetermined second threshold δDth.

Note that, in this case as well, there is also a case where the group g to which the lower-adjacent pixel pi, j−1 belongs is made up of this lower-adjacent pixel pi, j−1 alone, and in this case, the average value Dave-lower of the image data D of each pixel belonging to the group g is equal to the image data Di, j−1 of this lower-adjacent pixel pi, j−1.

Subsequently, in the case of determining that at least one of the conditions 3 and 4 is not satisfied (NO in step S10), the processing means 6 do not group the pixel of interest pi, j and the lower-adjacent pixel pi, j−1, but determination is made in the determination processing in step S9 that the above conditions 1 and 2 are satisfied, and accordingly, group the pixel of interest pi, j and the left-adjacent pixel pi−1, j (step S11).

At this time, for example, such as shown in FIG. 5, in the event that the left-adjacent pixel pi−1, j is not grouped with another pixel, the pixel of interest pi, j and the left-adjacent pixel pi−1, j are grouped, and accordingly, a group made up of the two horizontal adjacent pixels is newly formed. Also, for example, such as shown in FIG. 6, in the event that the left-adjacent pixel pi−1, j is grouped with another pixel and belongs to the group g, the pixel of interest pi, j is grouped so as to be added to the group g, and consequently, the group g is enlarged by one pixel which is the pixel of interest pi, j.

Figure 9A:
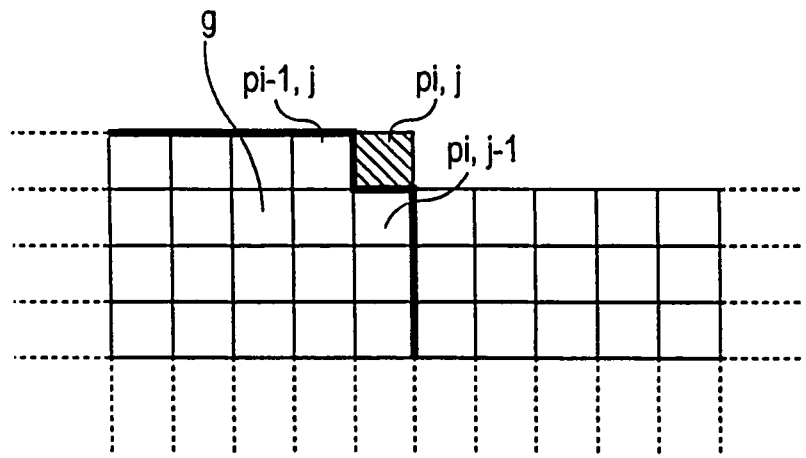
FIG. 9A is a diagram for describing an example of a group where two pixels are adjacent to the left and the underneath of a single pixel.
Figure 9B:
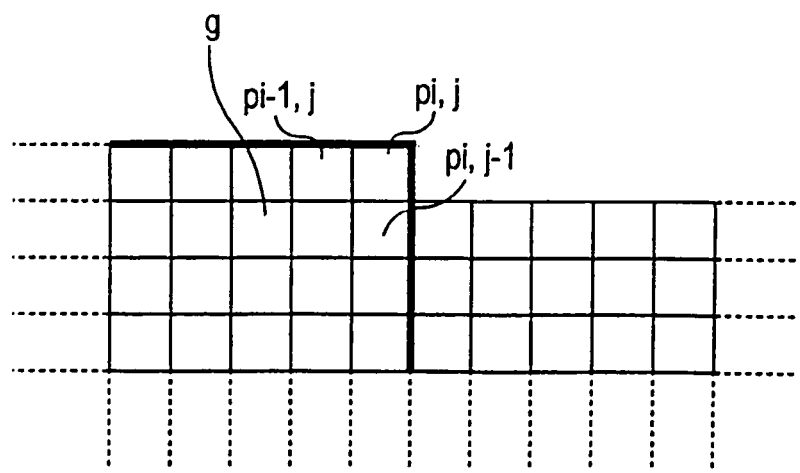
FIG. 9B is a diagram for describing an example wherein a single pixel is grouped with a pixel adjacent to the left thereof, and accordingly, is also grouped with a pixel adjacent to the underneath thereof.

Note that in the case that the group g to which the left-adjacent pixel pi−1, j belongs has a shape such as shown in FIG. 9A, for example, even in the event that determination is made in the determination processing in step S10 that at least one of the conditions 3 and 4 is not satisfied (NO in step S10), and consequently, the pixel of interest pi, j is not grouped with the lower-adjacent pixel pi, j−1, such as shown in FIG. 9B, in the event that the pixel of interest pi, j is grouped with the left-adjacent pixel pi−1, j (step S11), consequently, there is a case where the pixel of interest pi, j is grouped with the lower-adjacent pixel pi, j−1.

Next, in the case that determination is made in the determination processing in step S10 that both of the conditions 3 and 4 are satisfied (YES in step S10), the processing means 6 group the pixel of interest pi, j with the lower-adjacent pixel pi, j−1 and the left-adjacent pixel pi−1, j (step S12).

At this time, for example, such as shown in FIG. 7, in the event that both of the lower-adjacent pixel pi, j−1 and the left-adjacent pixel pi−1, j are not grouped with another pixel, the pixel of interest pi, j, the lower-adjacent pixel pi, j−1, and left-adjacent pixel pi−1, j are grouped, and a group made up of the three pixels is newly formed. Also, for example, such as shown in FIGS. 6 and 8, in the event that any one of the lower-adjacent pixel pi, j−1, and the left-adjacent pixel pi−1, j is grouped with another pixel, and belongs to the group g, the pixel of interest pi, j, and the pixel not belonging to the group g are grouped so as to be added to the group g, and accordingly, the group g is enlarged by two pixels.

Figure 10A:
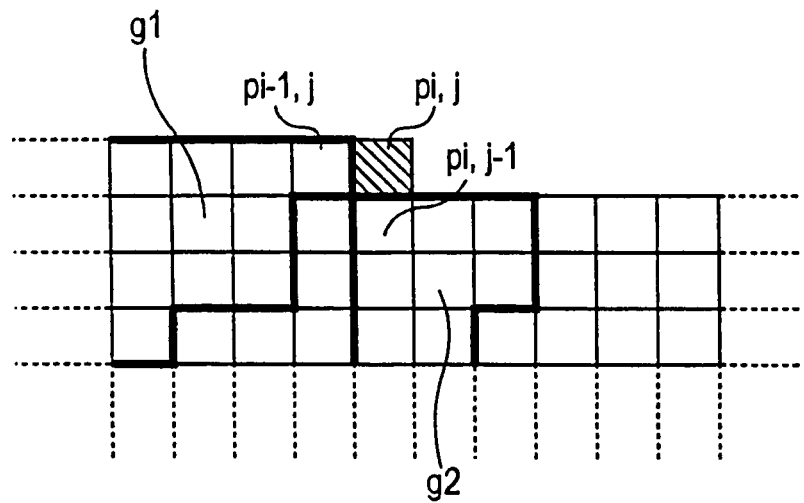
FIG. 10A is a diagram for describing an example wherein a group to which a pixel adjacent to the underneath of a single pixel belongs, and a group to which a pixel adjacent to the left thereof belongs are different groups.
Figure 10B:
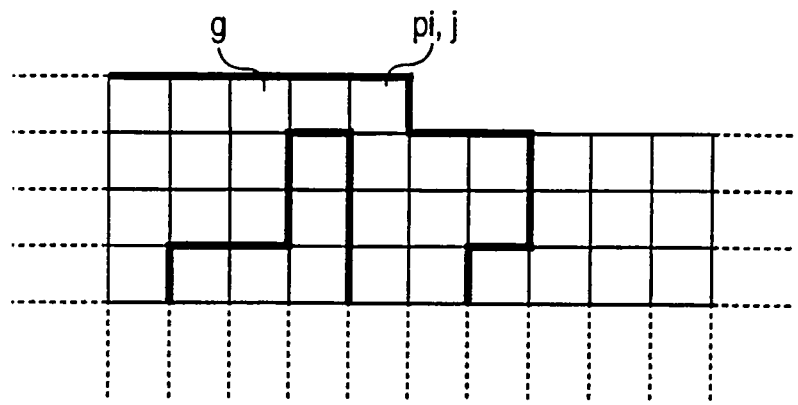
FIG. 10B is a diagram for describing an example wherein two groups are grouped with a single pixel to become a single group.

Also, for example, such as shown in FIG. 10A, in the event that the left-adjacent pixel pi−1, j belongs to a group g1, and the lower-adjacent pixel pi, j−1 belongs to another group g2, when grouping the pixel of interest pi, j with the lower-adjacent pixel pi, j−1, and the left-adjacent pixel pi−1, j (step S12), such as shown in FIG. 10B, the group g1 and the group g2 are grouped via the pixel of interest pi, j to become the single group g.

On the other hand, in the case of determining that at least one of the conditions 1 and 2 is not satisfied in the determination processing in step S9 (NO in step S9), the processing means 6 proceed to determination processing in step S13, and in the same way as the above, determine whether or not the conditions 3 and 4 are satisfied (step S13).

Subsequently, in the case of determining that both of the conditions 3 and 4 are satisfied (YES in step S13), the processing means 6 have determined that at least one of the conditions 1 and 2 is not satisfied in the determination processing in step S9 (NO in step S9), and accordingly, do not group the pixel of interest pi, j with the left-adjacent pixel pi−1, j, but group the pixel of interest pi, j with the lower-adjacent pixel pi, j−1 alone (step S14).

At this time, upon grouping the pixel of interest pi, j with the lower-adjacent pixel pi, j−1 (step S14), consequently there is a case where the pixel of interest pi, j is grouped with the left-adjacent pixel pi−1, j, this is readily analogized from the cases shown in FIGS. 9A and 9B.

Upon grouping the pixel of interest pi, j with an adjacent pixel at the processing in step S11, S12, or S14, the processing means 6 update the number of pixels of the enlarged group g, and in the event that there is change regarding each of the coordinates of the left-edge and right-edge pixels, or each of the coordinates of the upper-edge and lower-edge pixels of the group g, update these. Also, for example, such as shown in FIG. 10B, in the event that multiple groups are grouped to become a single group, the processing means 6 update the group number of the group g grouped into a single group by selecting the minimum number of each of the group numbers of the multiple groups to have been grouped (step S15).

Also, the average-value calculating means 7 calculate and update the average value Dave of the image data D of each pixel belonging to the group g enlarged by adding the pixel of interest pi, j, or the group g grouped into a single group by grouping multiple groups (step S16).

Upon ending the processing in step S15, and the average value Dave of the image data D of each pixel belonging to the group g being calculated and updated by the average-value calculating means 7 (step S16), the processing means 6 continue the determination processing in step S4 and thereafter.

On the other hand, in the case that determination is made in the determination processing in step S13 that at least one of the conditions 3 and 4 is not satisfied (NO in step S13), the processing means 6 group the pixel of interest pi, j with neither the left-adjacent pixel pi−1, j nor the lower-adjacent pixel pi, j−1, and register this group as a new group to which the pixel of interest pi, j alone belongs (step S17)

Subsequently, the processing means 6 append a new group number to this new group, and record each of the coordinates of the horizontal and vertical-edge pixels as the coordinates (i, j) of the pixel of interest pi, j with the number of pixels of the group as 1. Also, the average-value calculating means 7 record the image data Di, j of this pixel of interest pi, j as the average value Dave of the image data D of this new group.

Also, as a result of determining that at least one of the conditions 3 and 4 is not satisfied with the determination processing in step S13 (NO in step S13), and the pixel of interest pi, j being not grouped with the lower-adjacent pixel pi, j−1, a new pixel is much less likely to be added in processing performed later, and accordingly, the processing means 6 determine whether or not the group g in an isolated state has occurred on the image T (step S18).

For example, in the case of the group g shown in FIG. 8, in processing performed later, when the pixel of interest is set to further the right side on the same horizontal line j, the pixel of interest may be added to the group g. Also, in the case of the group g shown in FIG. 6 for example, the pixel of interest may be added to the group g when the horizontal line j to be processed proceeds to a horizontal line j+1 that is one row above thereof in processing performed later. Therefore, these groups g are not in an isolated state on the image T.

Figure 11:
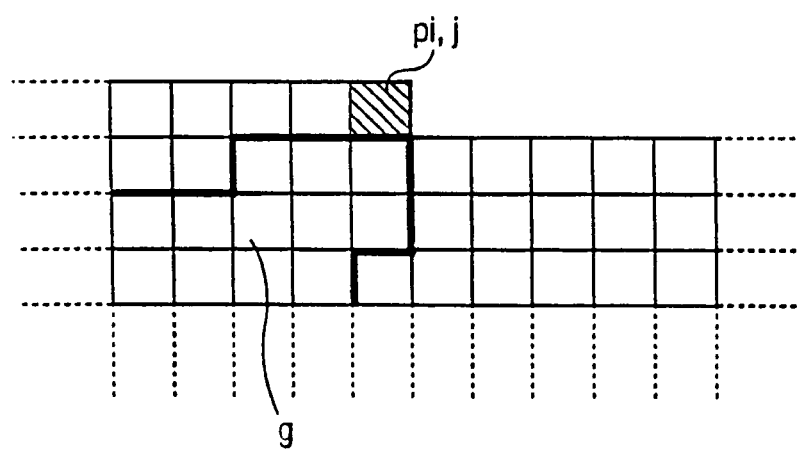
FIG. 11 is a diagram for describing an example of a group that is in an isolated state.

However, for example, in the case of the group g shown in FIG. 11, in processing performed later, even when the pixel of interest is set to further the right side on the same horizontal line j, or even when the horizontal line j to be processed proceeds to a horizontal line j+1 that is one row above thereof, the pixel of interest is much less likely to be added to the group g anymore. Therefore, the group g such as shown in FIG. 11 becomes the group g in an isolated state on the image T.

Upon thus determining that the group g in an isolated state on the image T has occurred (YES in step S18), the processing means 6 determine whether or not the number of all pixels belonging to the group g thereof is equal to or smaller than a predetermined threshold (step S19), and upon determining that the number of pixels is equal to or smaller than the threshold (YES in step S19), eliminate the group g thereof from the registered groups (step S20). This is because such an isolated group of which the number of pixels is small is a negligible group such as noise or the like caused within the image T.

Also, in the case of determining that no isolated group g has occurred (NO in step S18), or in the case that the isolated group g has occurred, but the number of pixels is greater than the threshold, and the group g thereof is a relatively great group (NO in step S19), the processing means 6 do not eliminate the group g thereof from the registered groups, and continue the determination processing in step S4 and thereafter.

Subsequently, upon the processing up to the right-edge pixel on the horizontal line j being completed (YES in step S4 in FIG. 3), and the processing up to the horizontal line of the uppermost stage of the image T ending (YES in step S7), the processing means 6 divide the image T into multiple regions with finally obtained each group as each region of the image T (step S21).

Upon ending the processing of one image worth of the image T, the processing means 6 store each piece of the image data Di, j of each pixel pi, j of the image T in unshown storage means, and also store information such as each of the coordinate (i, j) of each pixel belonging to each region (group), the number of pixels, each of the coordinates of the horizontal-edge pixels, and each of the coordinates of the vertical-edge pixels, the average value Dave of the image data D of regions (groups), and the like in the storage means in a manner correlated with the image T along with each piece of the image data Di, j of the image T, and the like. Also, the processing means 6 externally output such information as appropriate.

Also, at this time, for example, an arrangement may be made wherein the center point with the intermediate point of the pixel positions of the horizontal edges of each region as i coordinate, and the intermediate point of the pixel positions of the vertical edges as j coordinate is calculated for each region, and is stored in the storage means along with the above pieces of information, and is externally output as appropriate.

Next, the operation of the image processing device 1 according to the present embodiment will be described.

When determination is made by the processing means 6 whether or not the pixel of interest pi, j, and the left or lower-adjacent pixel pi−1, j or pi, j−1 are grouped, with the above image region dividing method disclosed in Japanese Unexamined Patent Application Publication No. 2000-67240, or a conventional technique according to the compression processing or the like of image information, the image data D of each pixel p is classified with a uniformly predetermined classifying method, determination is made in accordance with this classification whether to execute grouping. Therefore, even in the event that difference of each piece of the image data D of adjacent pixels p is insignificant, when each piece of the image data D belongs to a different classification, the adjacent pixels p are not readily integrated into a single group.

Therefore, for example, there has been a case where even when the same imaged object such an object or the like is imaged within the image T, a region where the same imaged object is imaged is divided into multiple regions since each piece of the image data D of the adjacent pixels p slightly differs.

Also, conversely, there has been a case where in the event that multiple imaged objects are imaged within the image T, and two pixels belonging to mutually a different imaged object are adjacent to each other at a border portion thereof, the image data D of each pixel p has the same classification, these two pixels are integrated into a single group, and the imaged objects are not readily separated and extracted.

However, with the image processing device 1 according to the present embodiment, a uniformly predetermined classification standard is not provided, and as described above, according to the processing means 6, the image data Di, j of the pixel of interest pi, j, and the image data Di−1, j, or Di, j−1 of left or lower-adjacent pixel pi−1, j or pi, j−1 are compared in accordance with the above condition 1 or condition 3, and determination is made whether or not the adjacent pixels are grouped based on the edge intensity ΔD thereof.

Therefore, in the event that difference of each image data D of adjacent pixel p is insignificant, the adjacent pixels p may be integrated into a single group, and for example, even in the event that each piece of the image data D of adjacent pixels p slightly differs within a region of the image T where the same imaged object is imaged, the region where the same imaged object is imaged may be extracted by being grouped into a single region.

Also, with the image T imaged by the imaging means 2 such a CCD camera or the like, there is a case where, in particular, with a border portion between a single imaged object and another imaged object, difference of the image data D is insignificant between a pixel p of a marginal portion of a region where this single imaged object is Imaged, and a pixel that is a pixel adjacent to the pixel p thereof, but is included in a region where the other imaged object is imaged, which should not be included in the region where the single imaged object is imaged.

In such a case, upon grouping the adjacent pixels in accordance with only the above condition 1 or condition 3, the region that should correspond to the single imaged object is enlarged up to the region where the other imaged object is imaged, and accordingly, a region on the image T where each imaged object is imaged is not readily divided into separate regions.

However, with the image processing device 1 according to the present embodiment, such as the condition 2 or condition 4 other than the condition 1 or condition 3, the average value difference δD is calculated within the group g to which the pixel of interest pi, j, and the left or lower-adjacent pixel pi−1, j or pi, j−1 belong, and based on this determination is made whether or not the adjacent pixels are grouped.

Thus arranged, difference of each piece of image data D of the adjacent pixels is insignificant, and even in the event that difference of the image data D at a local portion restricted within the image T is insignificant (i.e., even in the case where the above condition 1 or condition 3 is satisfied), in the case that the image data Di, j of the pixel of interest pi, j has a value significantly different from the average value Dave of the image data D of the group g to which the adjacent pixels belong, i.e., a certain region (equivalent to the group g) having the relatively great number of pixels within the image T (i.e., in the case that the above condition 2 or condition 4 is not satisfied), the adjacent pixels are prevented from being grouped.

Therefore, the region that should correspond to the single imaged object is prevented from being enlarged up to the region where the other imaged object is imaged, whereby a region on the image T where each imaged object is imaged can accurately be extracted by being divided into separate regions.

Further, like the image data D according to the present embodiment, for example, image data represented with 256 luminance gradations is used for determination and the like of the above conditions 1 through 4 without being subjected to compression processing or the like, whereby the determination can be made using the abundant information effectively without decreasing the information amount included in the image data D, and determination can be made precisely whether or not adjacent pixels are grouped.

Figure 12:
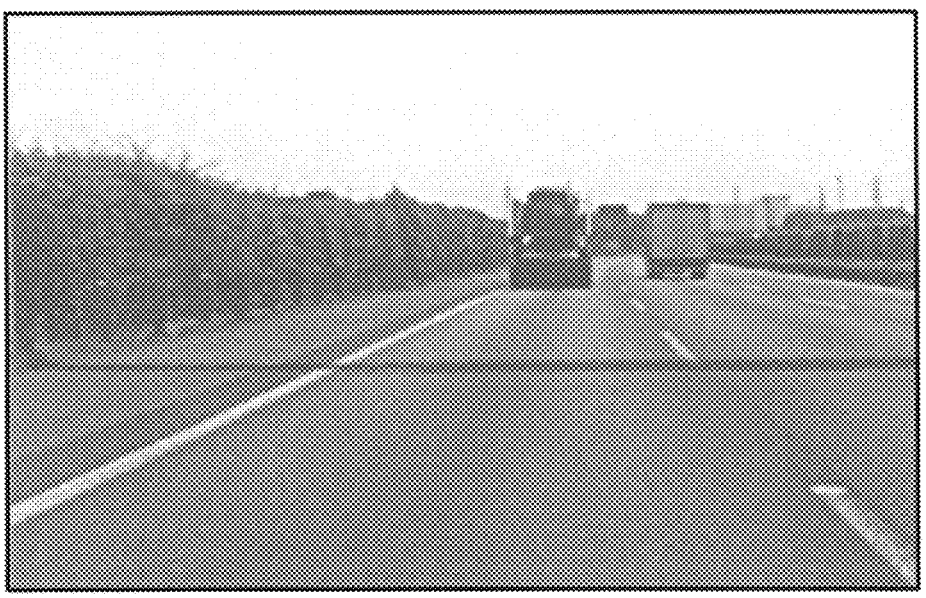
FIG. 12 is a photograph indicating a specific example of an image imaged by the imaging means.
Figure 13:
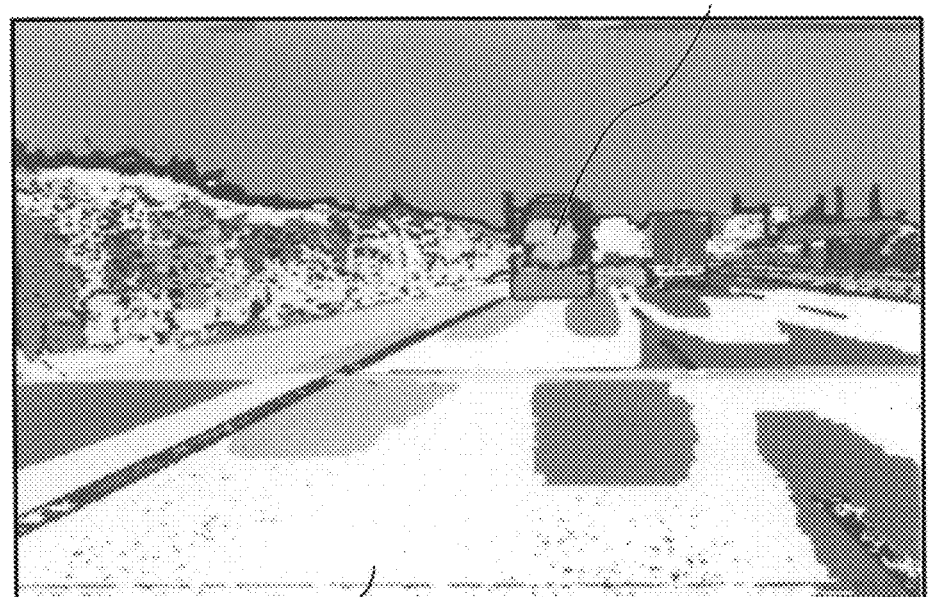
FIG. 13 is a photograph indicating a specific example wherein the image in FIG. 12 is divided into multiple regions.

Therefore, for example, when the image T imaged such as shown in FIG. 12 is subjected to image processing at the image processing device 1 according to the present embodiment, such as shown in FIG. 13, with the image T where multiple imaged objects are imaged, a similar luminance portion of a single imaged object can be accurately extracted by being divided into regions r, and also with regard to different imaged objects having similar luminance, the regions r can accurately be separated and extracted. Upon decreasing the information amount by subjecting image data to compression processing or the like, such imaged object is not readily accurately be separated and extracted.

Note that, in FIG. 13, each divided region is illustrated by being shaded, and also each pixel of which the registration of the group g has been eliminated with the above processing in step S20 is shown in black.

As described above, according to the image processing device 1 according to the present embodiment, an arrangement is made wherein the abundant information is used effectively without subjecting image data to compression processing or the like, thereby determining whether or not the pixel of interest (single pixel) pi, j and the adjacent pixels pi−1, j, pi, j−1 are grouped based on not only difference (edge intensity) ΔD between the image data Di, j of the pixel of interest (single pixel) pi, j, and the image data Di−1, j, Di, j−1 of pixels pi−1, j, pi, j−1 adjacent to the pixel of interest pi, j, but also difference (average value difference) δD between the image data Di, j of the pixel of interest pi, j, and the average value Dave of the image data D of each pixel of the group g to which the pixels pi−1, j, pi, j−1 adjacent to the pixel of interest pi, j, belong.

Therefore, the information amount of the image data D is used effectively, like an imaged object imaged within the image T, a pixel where an imaged object that should be integrated as a single group (e.g., a single object) imaged is accurately grouped, a pixel where an imaged object that should not be integrated as a single group (e.g., a different object) is not grouped, whereby the image T can accurately be divided into multiple regions. Also, therefore, an imaged object can accurately be separated and extracted from out of the image T.

Also, like the present embodiment, an arrangement is made wherein in the case that the image data D of each pixel p is sequentially input from the imaging means 2 to the processing means 6, each process is carried out simultaneously in parallel with input of the image data D, and the pixel of interest (single pixel) pi, j, and the image data D that is input before the pixel of interest pi, j is input are compared, whereby the processing can be executed simultaneously in parallel with input without awaiting input of the image data D of all pixels for one image, and accordingly, grouping processing can be executed in real-time.

Note that, with the present embodiment, for example, an arrangement is made wherein the image data D of each pixel p is output in order from the left-edge pixel on the same horizontal line j of the image T shown in FIG. 2 from the imaging means 2, and also the image data D is output while switching sequentially from the horizontal line j on the lowermost side to the upper side, and accordingly, the adjacent pixel p to be compared with the pixel of interest (single pixel) pi, j is set to the left-adjacent pixel pi−1, j or the lower-adjacent pixel pi, j−1 that has been input previously, but it goes without saying that the adjacent pixel p to be compared is set in accordance with the transmission sequence of each piece of the image data D from the imaging means 2.

Also, in the case that real-time nature is not requested for the grouping processing, an arrangement may be made wherein the grouping processing is carried out after the image data D of all pixels for one image is input. In this case, a method for setting the adjacent pixel p to be compared with the pixel of interest (single pixel) pi, j is determined beforehand, and in accordance with this, the same processing as with the above present embodiment is carried out.

Further, in the case that the image processing device 1 according to the present embodiment is used, for example, by being mounted on a vehicle, such as shown in FIGS. 12 and 13, a region where a vehicle in front, a road surface, a lane line, or the like is imaged within the image T can be extracted by being effectively divided.

Also, in such a case, further, such as a region within the image T imaged with high luminance like a light source such as a lighting signal light on a traffic light, taillights of a vehicle in front, or the like, or conversely, a region within the image T imaged with low luminance such as a tunnel or the like, in the case that an imaged object is imaged as image data in a luminance range peculiar thereto, a region where the image data is included in a particular numeric value range is extracted preferentially from out of the image T, and an imaged object thereof may accurately be extracted, and accordingly, the advantages of the present embodiment are exhibited more effectively.

Figure 3:
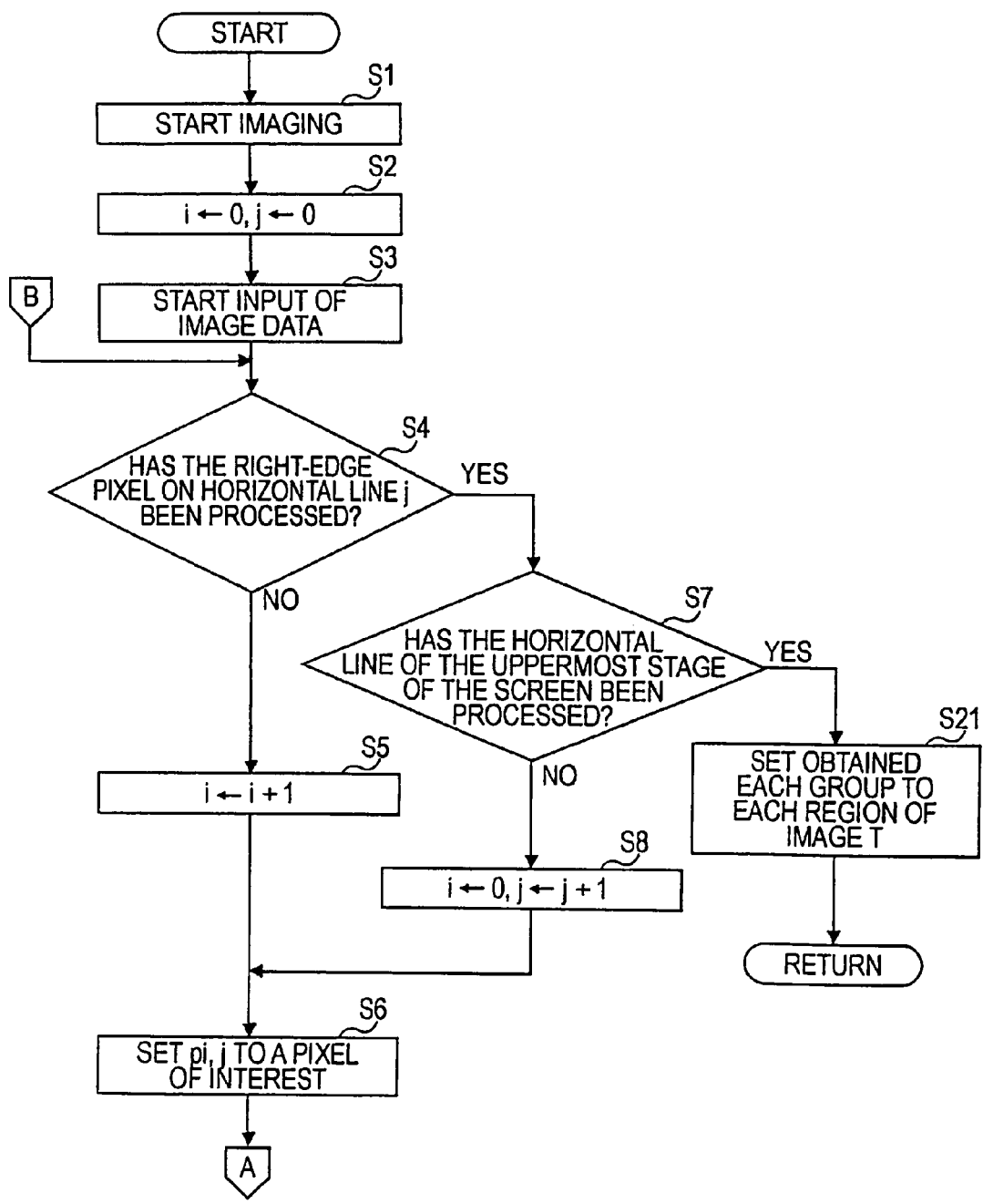
FIG. 3 is a flowchart illustrating a processing procedure of processing means and average-value calculating means.
Figure 4:
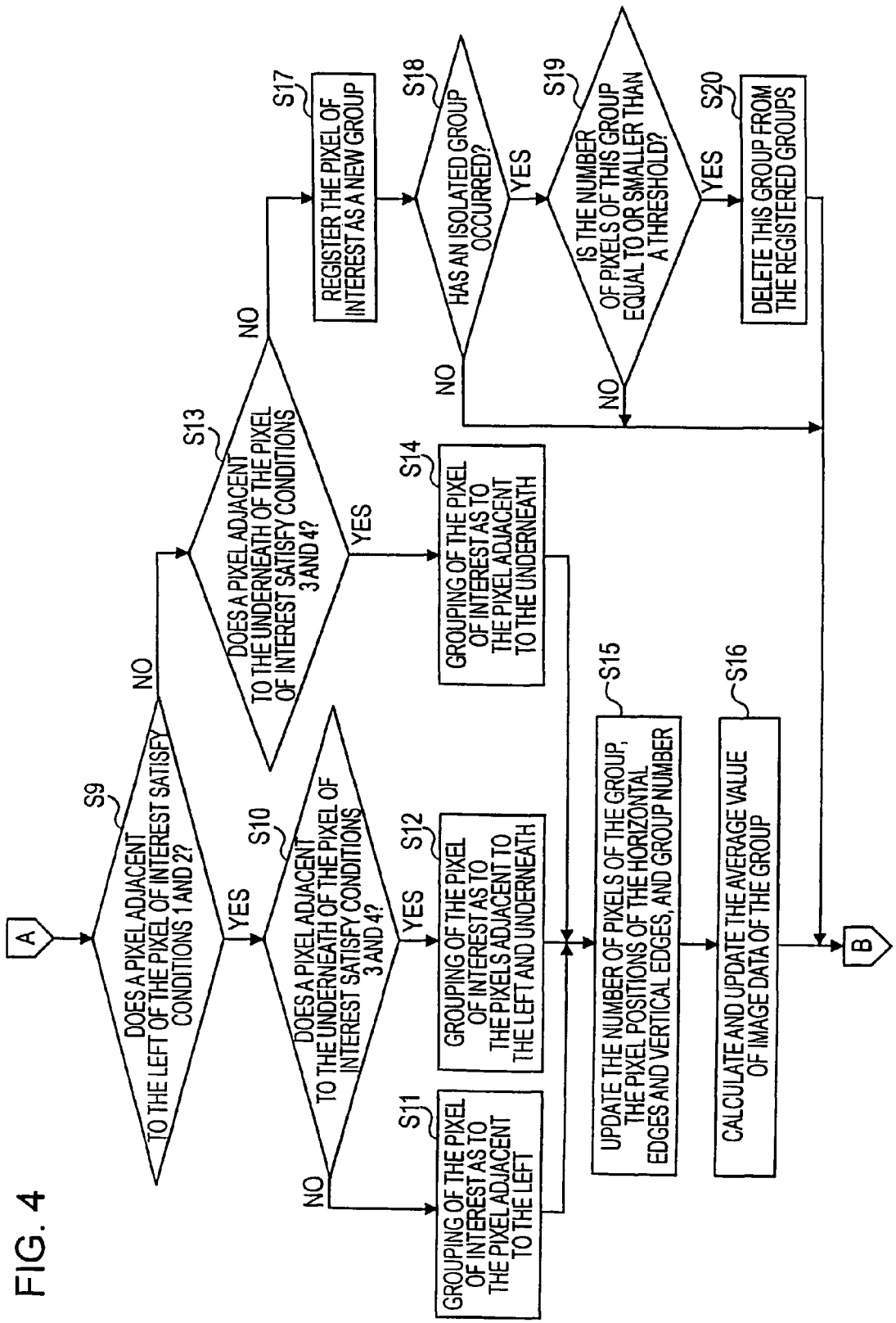
FIG. 4 is a flowchart illustrating the processing procedure of the processing means and average-value calculating means.

Thus, for example, an arrangement may be made wherein, with the flowchart shown in FIGS. 3 and 4, at the time of setting the pixel of interest to the pixel pi, j (step S6), in the case that the image data Di, j of the pixel of interest (single pixel) pi, j, and the image data Di−1, j, Di, j−1 of pixels pi−1, j, pi, j−1 adjacent to the left or underneath of the pixel of interest pi, j are both included in a predetermined numeric value range, before each process of the determination processing in step S9 and thereafter is executed, the pixel of interest pi, j within the numeric value range, and the adjacent pixels pi−1, j, pi, j−1 are preferentially grouped.

That is to say, like a light source such as the above signal light, taillight, or the like, in the case of extracting a region imaged with high luminance, the above numeric value range is set, for example, as a numeric value range of which the luminance is equal to or greater than 200, and also, like the above tunnel or the like, in the case of extracting a region imaged with low luminance, the above numeric value range is set, for example, as a numeric value range of which the luminance is equal to or smaller than 50. Also, the numeric value range may be set as a numeric value range partitioned into the upper limit and the lower limit.

Also, as described above, in the case that the image data Di, j of the pixel of interest (single pixel) pi, j, and the image data Di−1, j, Di, j−1 of the left or lower-adjacent pixel pi−1, j, pi, j−1 are in a predetermined numeric value range, when an arrangement is made so that these adjacent pixels are preferentially grouped, conversely, in the event that, of each piece of the image data D of adjacent pixels p, one piece of the image data D is in a predetermined numeric value range, and the other piece of the image data D is out of the numeric value range, these adjacent pixels are preferably arranged so as not to be grouped.

Thus, an arrangement may be made wherein only the pixels p of which the image data D is in a predetermined numeric value range is accurately grouped, and the pixels p of which the image data D is out of a predetermined numeric value range are not grouped, and accordingly, within the image, a region of which the image data D is in a predetermined numeric value range can accurately be extracted by being separated from other regions.

On the other hand, as described above, with the present embodiment, in the case that the conditions 1 through 4 are not satisfied, a region can accurately be divided so as not to group adjacent pixels, but therefore, conversely, when noise or the like enters the image T, for example, a region that should be extracted as a single region corresponding to a single imaged object imaged within the image T may be divided into multiple regions due to the noise thereof or the like.

In order to solve this problem, for example, the minimum values of the pixel intervals of two groups g1 and g2 that are not adjacent in the image T, i.e., in the case of the marginal portions of the two groups g1 and g2 being connected with a straight line, the minimum values of the number of pixels arrayed on the straight lines thereof are equal to or smaller than a predetermined threshold and are approximated, and also, in the case that difference of each average value of the image data D of each pixel belonging to these two groups g1 and g2 is equal to or smaller than a predetermined threshold, and is insignificant difference, an arrangement may be made wherein these two groups g1 and g2 are integrated as the single group g.

Also, with the present embodiment, description has been made regarding a case where the image data D of which the luminance is converted into monochrome, e.g., grayscale such as 256 gradations or the like, but as described above, the present invention is not restricted to this, and for example, color image data represented with RGB values may be used.

At this time, in the case that the image data D of each pixel p is commonly represented with (R, G, B), and particularly, the image data D of the pixel of interest pi, j is represented with (Ri, j, Gi, j, Bi, j), and the image data D of a pixel adjacent to the pixel of interest pi, j is represented with (R*, G*, B*), for example, edge intensity ΔD(i, j) between the pixel of interest pi, j and a pixel p adjacent thereto with the above condition 1 or condition 3 can be calculated as follows, for example.

$$\Delta D(i,j) = |Ri, j - R^*| + |Gi, j - G^*| + |Bi, j - B^*| \quad (5)$$

Also, average-value difference δD(i, j) between the image data Di, j of the pixel of interest pi, j, and the average value Dave of the image data D of each pixel belonging to the group g to which a pixel P adjacent to the pixel of interest pi, j belongs with the above condition 2 or condition 4 can be arranged to be calculated as follows, for example.

$$\delta D(i,j) = |Ri, j - \Sigma R/n| + |Gi, j - \Sigma G/n| + |Bi, j - \Sigma B/n| \quad (6)$$

Note that, with the above Expression (6), Σ represents the sum regarding all pixels belonging to the group g, and n represents the number of pixels of the group g. Also, when calculating the average value Dave of the image data D of each pixel belonging to the group g at the processing in step S16 in FIG. 4, the average-value calculating means 7 calculate and update the average value Dave in a form of (ΣR/n, ΣG/n, ΣB/n).

Thus, like the image processing device 1 according to the above present embodiment, the same effective advantage as with a case where the monochrome image data D is used can be provided, and also color information represented with the average value Dave (ΣR/n, ΣG/n, ΣB/n) of the image data D of each pixel belonging to the corresponding group is correlated with each region within the image T corresponding to each group finally obtained, whereby each region within the image T can be recognized and classified with color information.

Also, based on the color information of each region, the color of an imaged object corresponding to each region can be determined, and also the imaged object itself thereof (e.g., is a lighting signal light on a traffic light a red signal, yellow signal, or blue signal, etc.) can be determined.

Second Embodiment

With the image processing device 1 according to the above first embodiment, description has been made regarding a case where determination is made whether or not the pixel of interest (single pixel) pi, j is grouped with a pixel p adjacent thereto based on only the image data D such as the luminance of the pixel p within the image T, but further if an arrangement is made wherein a stereo camera is used as the imaging means 2, a pair of imaged images are subjected to stereo matching processing, and distance information on real space is held for each pixel of the images, whereby determination can be made while taking distance information on real space into consideration when determining whether or not the pixel of interest (single pixel) pi, j is grouped with the pixel p adjacent thereto.

An arrangement is made wherein determination of grouping is executed while taking distance information on real space into consideration, whereby, at the time of dividing an image into multiple regions, the image can be divided into regions while distinguishing the position on real space of each imaged object imaged within the image, and accordingly, the image can be divided while accurately distinguishing each imaged object. With the second embodiment, an image processing device 10 thus arranged will be described.

Note that description will be made below regarding a case where the image processing device 10 is mounted on a vehicle such as an automobile, and an imaged object is imaged, such as a vehicle in front which is driving in front of the vehicle, or the like, but the present embodiment is not restricted to this, and rather may be applied to various applications.

Figure 14:
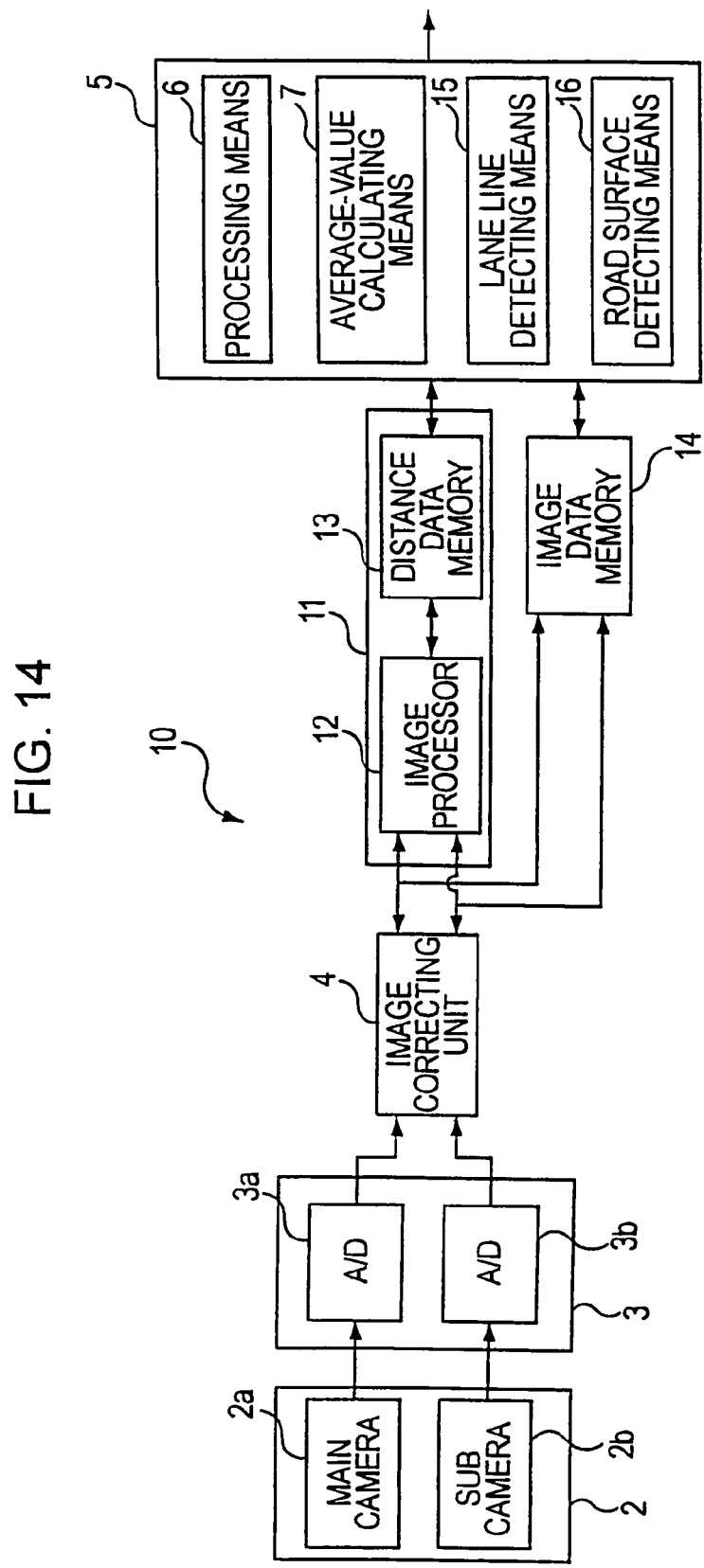
FIG. 14 is a block diagram illustrating the configuration of an image processing device according to a second embodiment.

The image processing device 10 according to the present embodiment is configured, such as shown in FIG. 14, in the same way as the image processing device 1 according to the first embodiment (see FIG. 1), so as to include imaging means 2, converting means 3, an image correcting unit 4, and a processing unit 5 including processing means 6 and average-value calculating means 7, and the like, but further so as to include distance detecting means 11 including an image processor 12 and the like, and so forth.

Note that the configuration of the upstream side of the processing unit 5 including the image processor 12 and the like have been described in detail in Japanese Unexamined Patent Application Publication No. 2006-72495 that the Present Assignee has submitted, and the like, which should be referred to for detailed description regarding this configuration. This configuration will be described below briefly.

With the present embodiment, the imaging means 2 in which each of image sensors such as a CCD, CMOS sensor, and the like, which are mutually synchronized, is housed, are a stereo camera for example, made up of a pair of a main camera 2a and a sub camera 2b attached to the neighborhood of a room mirror of a vehicle with a predetermined interval in the vehicle width direction, and are configured so as to execute imaging with a predetermined sampling cycle to output a pair of images.

Of the pair of the cameras, the main camera 2a is a camera on the side near the driver, and images the image T such as shown in FIG. 2, for example. Note that description will be made below regarding a case where the image T imaged by this main camera 2a is subjected to grouping processing of each pixel p, or the like. Also, in order to distinguish this image from an image imaged by the sub camera 2b, hereafter, the image T imaged by the main camera 2a will be referred to as a reference image T, and the image imaged by the sub camera 2b will be referred to as a comparative image.

Note that, with the present embodiment as well, the main camera 2a and the sub camera 2b of the imaging means 2 are configured to each obtain monochrome image data D, but imaging means configured to image color image data represented with RGB values or the like may be employed, and the present invention is also applied to this case.

Also, with the present embodiment as well, in the case that the reference image T such as shown in FIG. 2 and a comparative image are imaged by the main camera 2a and the sub camera 2b of the imaging means 2, imaging is executed by sequentially scanning from the imaging device on the leftmost side of each horizontal line j of the reference image T in the right direction while sequentially switching the horizontal line j to be scanned upwards from the lowermost line, and sequentially transmitting each piece of the image data D of the reference image T and the comparative image to the converting means 3 in the order imaged at each imaging device.

The converting means 3 are configured of a pair of analog digital converters 3a and 3b. Upon each piece of the image data D of the reference image T and the comparative image imaged for each imaging device (each pixel) at the main camera 2a and the sub camera 2b of the imaging means 2 being sequentially transmitted, the converting means 3 converts each piece of the image data D into each piece of image data D that is a digital value serving as grayscale luminance of 256 gradations, and output this to an image correcting unit 4.

The image correcting unit 4 sequentially subjects each piece of the image data D of the transmitted reference image T and comparative image to image correction such as removal of deviation or noise, correction of luminance, or the like, and sequentially stores each piece of the image data D of the reference image T and comparative image subjected to image correction in image data memory 14, and also sequentially transmits this to the processing unit 5. Also, the image correcting unit 4 sequentially transmits each piece of the image data D of the reference image T and comparative image subjected to image correction to the distance detecting means 11.

The image processor 12 of the distance detecting means 11 sequentially subjects each piece of the image data D of the reference image T and comparative image to stereo matching processing or filtering processing, thereby sequentially calculating a disparity dp corresponding to distance on real space for each pixel of the reference image T.

Figure 15:
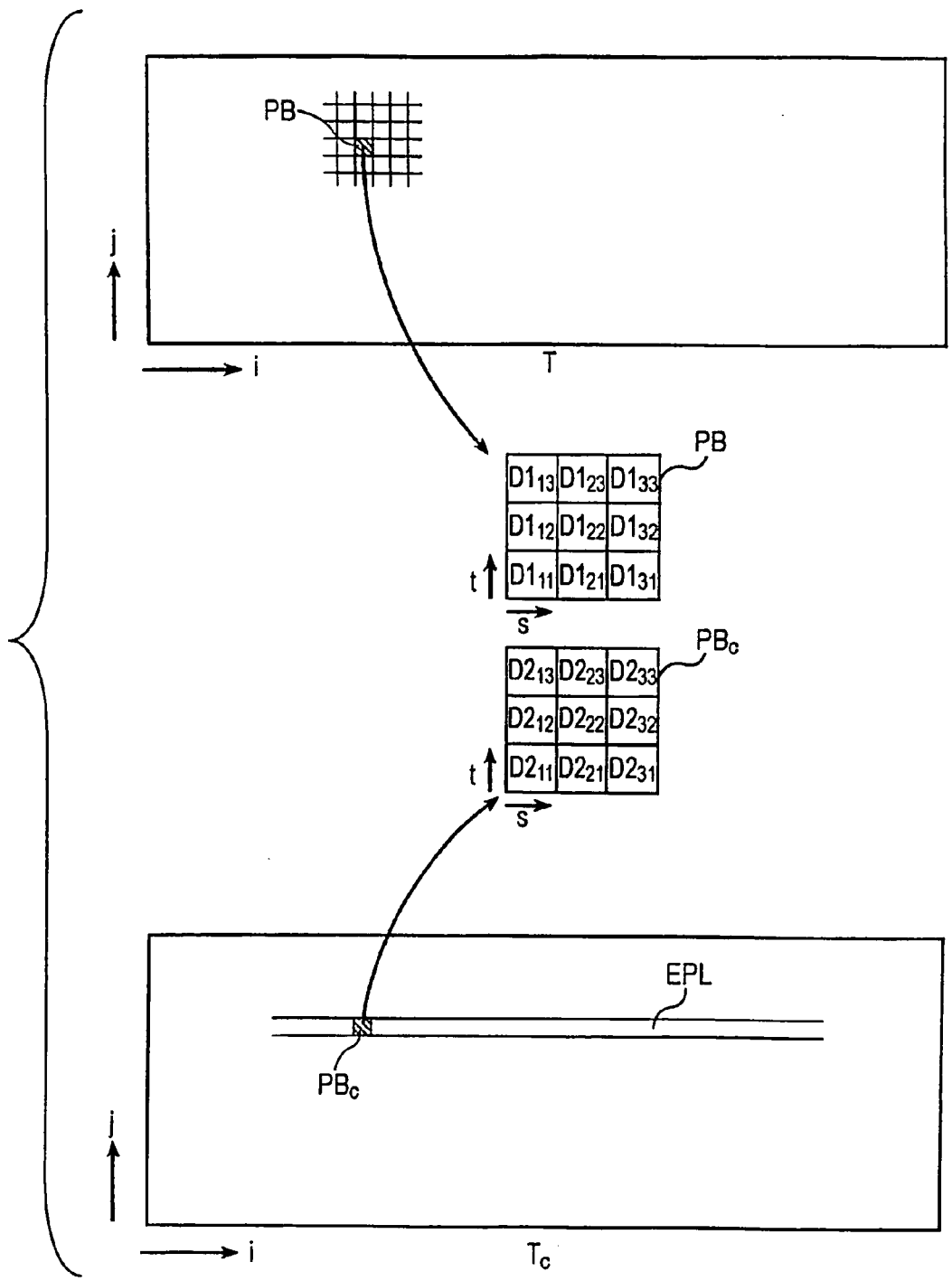
FIG. 15 is a diagram for describing stereo matching processing by an image processor of distance detecting means.

With the stereo matching processing at the image processor 12, upon each piece of the image data D of the reference image T and comparative image Tc being transmitted, such as shown in FIG. 15, for example, a reference pixel block PB of a predetermined number of pixels such as 3×3 pixels, 4×4 pixels, or the like is set onto the reference image T, and with regard to each comparative pixel block PBc having the same shape as the reference pixel block PB on an epipolar line EPL within a comparative image Tc corresponding to the reference pixel block PB, an SAD value that is difference of a luminance pattern as to this reference pixel block PB is calculated in accordance with the following Expression (7), thereby determining the comparative pixel block PBc having the minimum SAD value.

$$SAD = \Sigma |D1s, t - D2s, t| \quad (7)$$

Note that, in the above Expression (7), D1s, t represents the image data D of each pixel within the reference pixel block PB, and D2s, t represents the image data D of each pixel within the comparative pixel block PBc. Also, the above sum is calculated regarding all pixels in ranges of $1 \leq s \leq 3$ and $1 \leq t \leq 3$ in the case that the reference pixel block PB and the comparative pixel block PBc are set as a region of 3×3 pixels for example, and in ranges of $1 \leq s \leq 4$ and $1 \leq t \leq 4$ in the case that the reference pixel block PB and the comparative pixel block PBc are set as a region of 4×4 pixels.

With regard to each reference pixel block PB of the reference image T, the image processor 12 thus sequentially calculates a disparity dp from the positions on the comparative image Tc of the determined comparative pixel block PBc, and the positions on the reference image T of this reference pixel block PB. Hereafter, an image obtained by assigning a disparity dp to each pixel of the reference image T will be referred to as a distance image. Also, the information of the disparity dp calculated for each pixel, i.e., a distance image is sequentially stored in the distance data memory 13 of the distance detecting means 11, and is also sequentially transmitted to the processing unit 5.

Note that if we say that on real space, with a point on a road surface of the central immediately underneath of the pair of the cameras 2a and 2b as the origin, the vehicle width direction (i.e., horizontal direction) of the vehicle is the X-axis direction, the vehicle height direction (i.e., height direction) is the Y-axis direction, and the vehicle length direction (i.e., distance direction) is the Z-axis direction, a point on real space (X, Y, Z), pixel coordinates (i, j) on the distance image, and a disparity dp can uniquely be correlated by coordinate conversion based on the principle of triangulation represented with the following Expressions (8) through (10).

$$X = CD/2 + Z \times PW \times (i - IV) \quad (8)$$

$$Y = CH + Z \times PW \times (j - JV) \quad (9)$$

$$Z = CD/(PW \times (dp - DP)) \quad (10)$$

With the above Expressions, CD denotes the interval of the pair of the cameras, PW denotes a view angle per one pixel, CH denotes the mounting height of the pair of the cameras, IV and JV denote i coordinate and j coordinate on the distance image at the infinite point of the front of the vehicle, and DP denotes a vanishing point disparity.

Also, in order to improve the reliability of a disparity dp, the image processor 12 subjects the disparity dp obtained at the stereo matching processing such as described above to filtering processing, thereby outputting only a disparity dp determined to be valid.

For example, even in the event that the reference pixel block PB of 4×4 pixels made up of only the video of a road surface that is poor in features is subjected to stereo matching processing on the comparative image Tc, correlation becomes high at all of portions where the road surface is imaged of the comparative image Tc, and accordingly, even when the corresponding comparative pixel block PBc is determined, and a disparity dp is calculated, the reliability of this disparity dp is low. Therefore, such a disparity dp is subjected to filtering processing to invalidate this disparity dp, and 0 is output as the value of the disparity dp.

Figure 16:
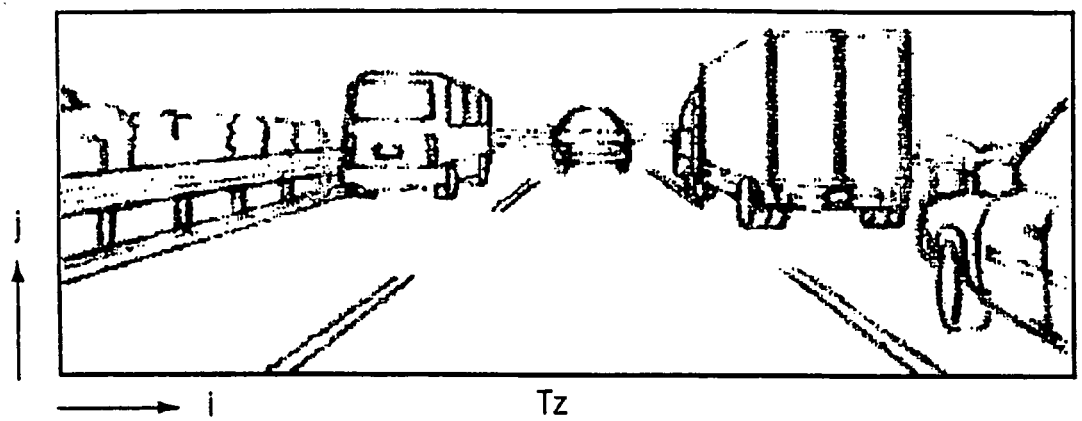
FIG. 16 is a diagram illustrating an example of a created distance image.

Accordingly, upon creating a distance image Tz by assigning (i.e., correlating) a disparity dp calculated validly to each pixel of the reference image T, for example, such as shown in FIG. 16, the distance image Tz becomes an image wherein a valid disparity dp is calculated as to a marginal portion (edge portion) or the like of an imaged object that is a portion having significant features on the reference image T. Note that, with regard to creation of the distance image Tz, an arrangement may be made wherein a disparity dp is converted into distance Z or the like beforehand in accordance with the above Expression (10) or the like, and the distance image Tz is created by assigning the distance Z or the like to each pixel of the reference image T.

With the present embodiment, with each process of the processing means 6 and average-value calculating means 7 of the processing unit 5, the disparity dp of each pixel of the distance image Tz is used by being converted into distance Z on real space in accordance with the above Expression (10) or the like as appropriate.

With the present embodiment as well, the processing unit 5 is configured of a computer in which unshown CPU, ROM, RAM, input/output interface, and the like are connected to a bus, and includes processing means 6 and average-value calculating means 7. With the present embodiment, the processing unit 5 further includes lane line detecting means 15 configured to detect lanes indicated on both sides of the vehicle, and road surface detecting means 16 configured to detect a road surface. Note that, with the present invention, continuous lines and dashed lines on a road surface, such as no-passing lines, partition lines for partitioning a side strip from a roadway, and so forth, will be referred to as a "lane lines".

Further, front vehicle detecting means configured to detect a vehicle in front, or the like may be provided to the processing unit 5, and as appropriate, an arrangement may be made wherein a measured value is input from a sensor or the like such as a speed sensor, a yaw rate sensor, a steering angle sensor configured to measuring the steering angle of a steering wheel, or the like.

Now, the lane line detecting means 15 and the road surface detecting means 16 will be described before describing the processing at the processing means 6 and the average-value calculating means 7 of the processing unit 5 according to the present embodiment. Note that, with the present embodiment, as described below, an arrangement is made wherein lanes indicated on a road surface are detected at the lane line detecting means 15, and based on the detection results, a road surface is detected at the road surface detecting means 16, but the road detecting means 16 are not restricted to a mode described below as long as it can detect a road surface.

Figure 17:
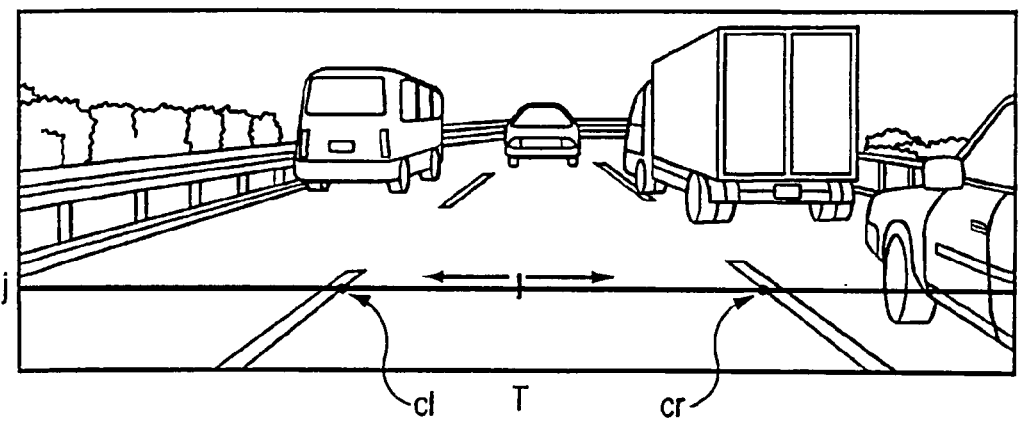
FIG. 17 is a diagram for describing an example of lane line candidate points detected by searching on the horizontal line of a reference image.

The lane line detecting means 15 detect lanes on both sides of the vehicle from out of the reference image T imaged by the imaging means 2. Specifically, such as shown in FIG. 17, the lane line detecting means 15 use the reference image T to search, for example, from the center of the reference image T in the horizontal direction on the horizontal line j of one pixel worth thereof, and detect pixels of which the luminance values greatly vary equal to or greater than a threshold set from the luminance value of an adjacent pixel as lane line candidate points cr and cl.

Subsequently, lane line candidate points are similarly detected on each horizontal line j while shifting the horizontal line j on the reference image T in the upper direction in increments of one pixel. At this time, in the case that determination is made based on the disparities dp or the like of the detected lane line candidate points that these lane line candidate points are not on the road surface, the lane line detecting means 15 exclude these lane line candidate points from the lane line candidate points. Note that, with the road surface in this case, the positions of the road surface in this sampling cycle is estimated from the subsequent behavior of the vehicle based on the road surface detected in the previous sampling cycle.

Subsequently, of the remaining lane line candidate points, based on lane line candidate points on the side closer to the vehicle, lanes are detected from both sides of the vehicle by being approximated to straight lines by Hough transformation or the like.

At this time, with Hough transformation, various straight lines are calculated as candidates, but for example, in the case that multiple lanes are detected on one side (e.g., right side) of the vehicle, straight lines are selected from both sides of the vehicle respectively by selecting a lane line having consistency as to a lane, line detected on the other side (e.g., left side) of the vehicle, or a lane line having consistency as to a lane line detected in the previous sampling cycle, or the like.

Figure 18:
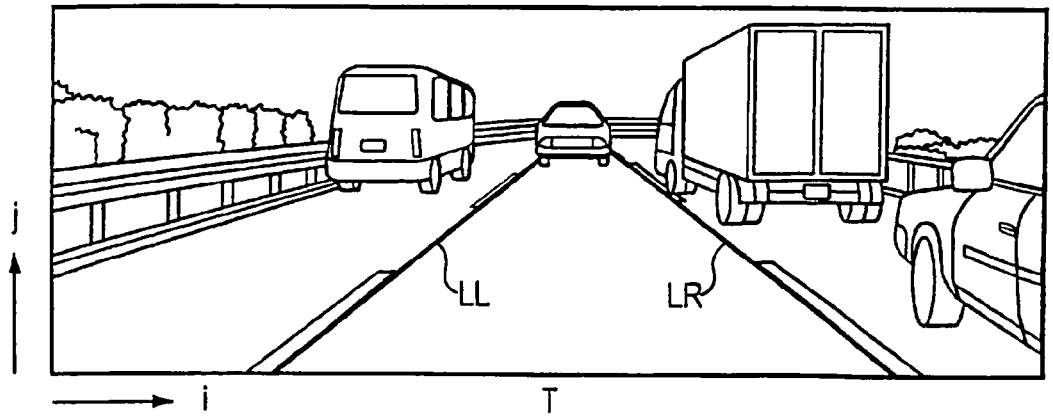
FIG. 18 is a diagram for describing an example of lanes detected at the left and right of a vehicle.

Thus, upon linearly detecting lanes on the side closer to the vehicle respectively, lane line candidate points are selectively connected from positional relationship with the straight lines, or the like, on the side farther away from this side based on the straight lines thereof and accordingly, such as shown in FIG. 18, lanes LR and LL are detected on both sides of the vehicle respectively. Note that the above processing arrangement of the lane line detecting means 15 has been described in detail in Japanese Unexamined Patent Application Publication No. 2006-331389 that the Present Assignee has submitted, and so forth, which should be referred to for detailed description.

The lane line detecting means 15 store information such as the right and left lane line positions LR and LL, and the lane line candidate points cr and cl, thus detected, and the like in unshown memory.

Figure 19A:
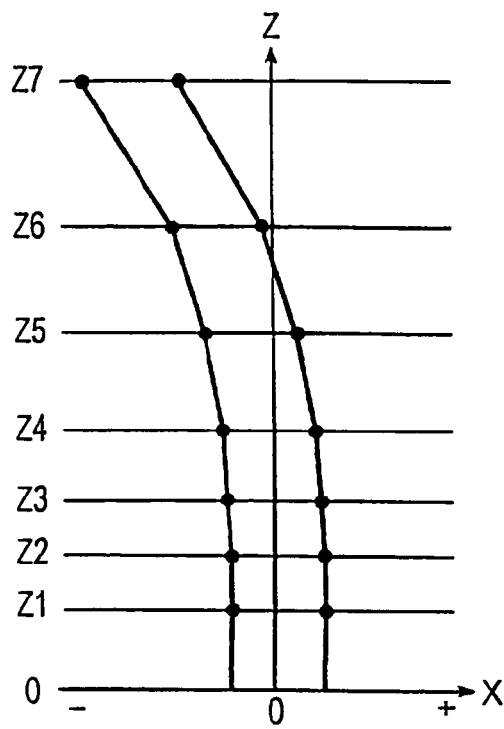
FIGS. 19A and 19B are diagrams for describing an example of a formed lane line model, where
Figure 19B:
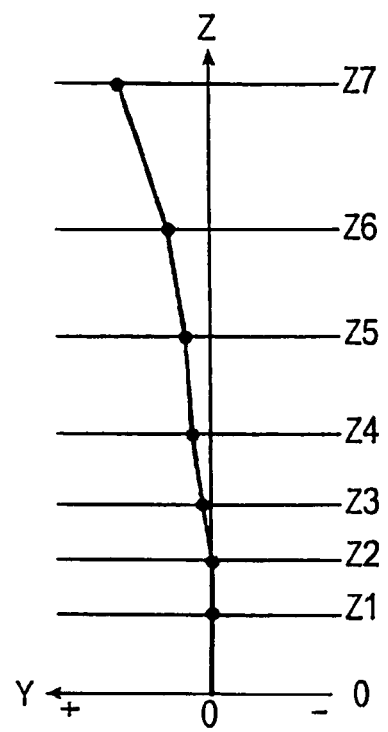

The road surface detecting means 16 form a lane line model in a three-dimensional manner based on the information of the right and left lane line positions LR and LL, and the lane line candidate points, detected by the lane line detecting means 15. With the present embodiment, such as shown in FIGS. 19A and 19B, the road surface detecting means 16 form a lane line model expressed by approximating the lanes of both sides of the vehicle by a three-dimensional linear expression for each predetermined section, and connecting these in a polygonal line shape. Note that FIG. 19A represents a lane line model on a Z-X plane, i.e., a geometric shape model, and FIG. 19B represents a lane line model on a Z-Y plane, i.e., a road height model.

Specifically, the road surface detecting means 16 divide the real space in front of the vehicle into each section from the position of the vehicle to, for example, distance Z7, subject lane line candidate points within each section to collinear approximation by the least squares method based on the positions (X, Y, Z) on real space of the lane line candidate points detected by the lane line detecting means 15, and calculate parameters aR, bR, aL, bL, cR, dR, cL, and dL of the following Expressions (11) through (14) for each section, thereby forming a lane line model.

Geometric Shape Model

Right lane line: $X = aR \cdot Z + bR$ (11)

Left lane line: $X = aL \cdot Z + bL$ (12)

Road Height Model

Right lane line: $Y = cR \cdot Z + dR$ (13)

Left lane line: $Y = cL \cdot Z + dL$ (14)

The road surface detecting means 16 thus form a lane line model, and detect a road surface on real space. The road surface detecting means 16 store the lane line model thus formed, i.e., the calculated parameters aR through dL of each section in the memory respectively.

With the present embodiment as well, in the same way as with the first embodiment, the processing means 6 and the average-value calculating means 7 are configured to execute each process in accordance with the flowchart shown in FIGS. 3 and 4.

That is to say, upon the image data D of each pixel of the reference image T sequentially being transmitted from the main camera 2a of the imaging means 2, the image data Di, j of the pixel of interest (single pixel) pi, j, and the image data D of a pixel p adjacent to the left or underneath thereof are compared, and determination is made based on the condition 1 or condition 3 whether or not the pixel of interest pi, j and the adjacent pixel p are grouped, and also the image data Di, j of the pixel of interest pi, j, and the average value Dave of each piece of the image data D of each pixel belonging to the group g to which the adjacent pixel p belongs are compared, and determination is made based on the condition 2 or condition 4 whether or not the pixel of interest pi, j and the adjacent pixel p are grouped.

Also, with the present embodiment, with the determination processing regarding whether or not the pixel of interest pi, j and the adjacent pixel p are grouped (steps S9, S10, and S13 in FIG. 4), based on the information of the disparity dp calculated for each pixel of the reference image T at the distance detecting means 11 (i.e., corresponding to the distance Z on real space), and the information of the road surface on real space detected by the road surface detecting means 16, determination is made whether to execute grouping by imposing further severe conditions.

Specifically, with the determination processing in steps S9, S10, and S13 in FIG. 4, in the case that difference |Zi, j−Zp| between distance Zi, j on real space corresponding to the pixel of interest pi, j, and distance Zp on real space corresponding to a pixel p adjacent to the left or underneath of the pixel of interest pi, j is equal to or greater than a predetermined threshold, even in the event that the above conditions 1 through 4 are satisfied, the processing means 6 do not group the pixel of interest pi, j and the adjacent pixel p.

This is because even in the case that the pixel of interest pi, j, and a pixel p adjacent thereto have image data D such as similar luminance or the like on the reference image T, in the event that points on real space corresponding these are separated in a level wherein the points are not regarded as the same imaged object, it can be conceived that the pixel of interest pi, j and the adjacent pixel p are not pixels corresponding to the same imaged object, but pixels corresponding to a separate imaged object.

Thus configured, like an imaged object imaged within the reference image T, the reference image T can accurately be divided into multiple regions so that a pixel where an imaged object to be integrated as a single group (e.g., a single object) is imaged is accurately grouped, and a pixel where an imaged object not to be integrated as a single group (e.g., a different object) is imaged is not grouped. Accordingly, an imaged object can accurately be separated and extracted from out of the reference image T.

However, with the present embodiment, there may be a case where the distance Zp on real space corresponding to the adjacent pixel p has not been calculated by the disparity dp calculated at the stereo matching processing being invalidated by the filtering processing at the distance detecting means 11, or the like. In such a case, an arrangement may be made so as to execute the determination processing by the following techniques. Technique 1: Determination is made whether or not difference |Zi, j−Z| between distance Zi, j on real space corresponding to the pixel of interest pi, j, and distance Z on real space closest to the distance Zi, j on real space corresponding to the pixel of interest pi, j of each distance Z on real space corresponding to each pixel belonging to the group g to which the adjacent pixel p belongs, is equal to or greater than the above threshold.

In this case, when the distance Z closest to the distance Zi, j on real space corresponding to the pixel of interest pi, j is separated by the above threshold or more, it can be conceived that the pixel of interest pi, j, and the group g to which the adjacent pixel p belongs do not correspond to the same imaged object but correspond to a separate imaged object.

Technique 2: The coordinates (X, Y, Z) of each point on real space corresponding to each pixel are calculated based on the each distance Z on real space corresponding to each pixel belonging to the group g to which the adjacent pixel p belongs, the inclination of the distance direction (Z-axis direction) as to the height direction (Y-axis direction) of the distribution of each point, the inclination of the distance direction as to the horizontal direction (X-axis direction), or the inclination of the distance direction as to a predetermined direction is calculated, and the distance Zp on real space corresponding to the adjacent pixel p is estimated from these inclinations. Subsequently, determination is made whether or not difference between this estimated distance Zp, and the distance Zi, j on real space corresponding to the pixel of interest pi, j is equal to or greater than the above threshold.

Specifically, in the event that the disparity dp has been calculated regarding each pixel belonging to the group g to which the adjacent pixel p belongs, the distance Z on real space corresponding to each pixel can be calculated from the above Expression (10), and also based on the distance Z, and the i coordinate and j coordinate on the reference image T of each pixel, X coordinate (position in the horizontal direction) and Y coordinate (height) on real space corresponding to each pixel can be calculated in accordance with the above Expressions (8) and (9), respectively.

Figure 20:
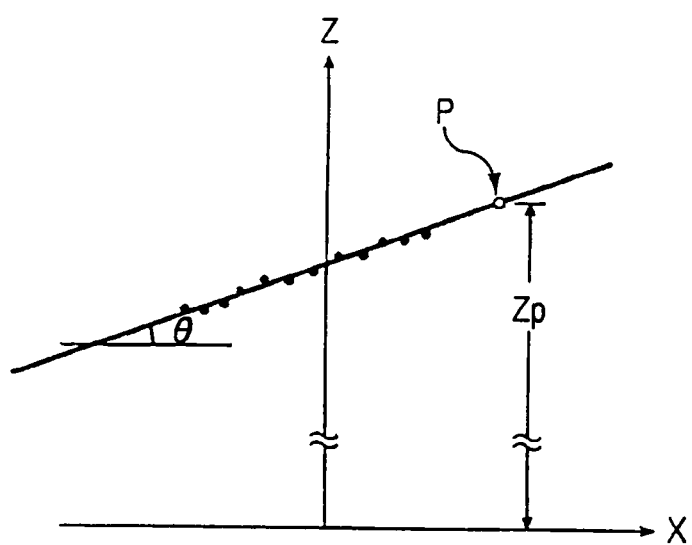
FIG. 20 is a diagram for describing an example wherein each point on real space corresponding to each pixel belonging to a group is plotted on an X-Z plane.

Subsequently, each point on real space corresponding to each pixel belonging to the group g is plotted on real space based on the coordinates (X, Y, Z) calculated such as described above. At this time, upon plotting each point on an X-Z plane, each point can be plotted such as shown in FIG. 20 for example, and the inclination θ of the distance direction (Z-axis direction) as to the horizontal direction (X-axis direction) of the distribution of each point can be calculated by subjecting the distribution of each point to collinear approximation, or the like.

Therefore, based on this inclination θ, the distance Zp of a point P on real space corresponding to the adjacent pixel p is estimated, and when difference between the estimated distance Zp, and the distance Zi, j on real space corresponding to the pixel of interest pi, j is less than the above threshold, and accordingly, these are close, the pixel of interest pi, j and the adjacent pixel p are grouped, and when these are separated the threshold or more, the pixel of interest pi, j and the adjacent pixel p are not grouped.

Figure 21:
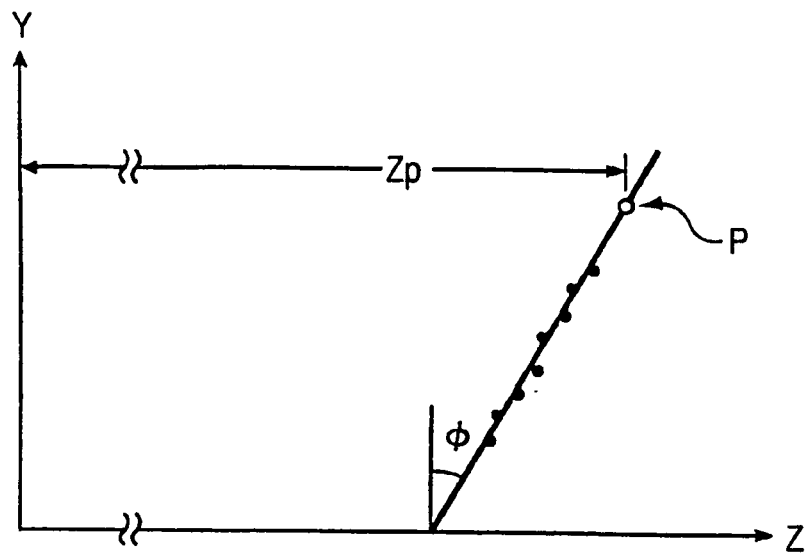
FIG. 21 is a diagram for describing an example wherein each point on real space corresponding to each pixel belonging to a group is plotted on a Y-Z plane.

Also, upon plotting each point on real space corresponding to each pixel belonging to the group g on a Y-Z plane, each point can be plotted such as shown in FIG. 21 for example, and the inclination φ of the distance direction (Z-axis direction) as to the height direction (Y-axis direction) of the distribution of each point may be calculated by subjecting the distribution of each point to collinear approximation, or the like.

Subsequently, based on this inclination φ, the distance Zp of a point P on real space corresponding to the adjacent pixel p is estimated, and when difference between the estimated distance Zp, and the distance Zi, j on real space corresponding to the pixel of interest pi, j is less than the above threshold, and accordingly, these are close, the pixel of interest pi, j and the adjacent pixel p are grouped, and when these are separated the threshold or more, the pixel of interest pi, j and the adjacent pixel p are not grouped.

Note that the horizontal direction (X-axis direction) on real space corresponds to the horizontal direction on the reference image T, and accordingly, the method for calculating the inclination θ in the distance direction as to the horizontal direction of the distribution of each point by plotting each point on an X-Z plane such as shown in FIG. 20 can be employed for the determination processing of grouping between the pixel of interest pi, j and the adjacent pixel p in the case that the group g to which the adjacent pixel p belongs has an expanse in the horizontal direction on the reference image T.

Also, the height direction (Y-axis direction) on real space corresponds to the vertical direction on the reference image T, and accordingly, the method for calculating the inclination φ in the distance direction as to the height direction of the distribution of each point by plotting each point on a Y-Z plane such as shown in FIG. 21 can be employed for the determination processing of grouping between the pixel of interest pi, j and the adjacent pixel p in the case that the group g to which the adjacent pixel p belongs has an expanse in the vertical direction on the reference image T.

Figure 22:
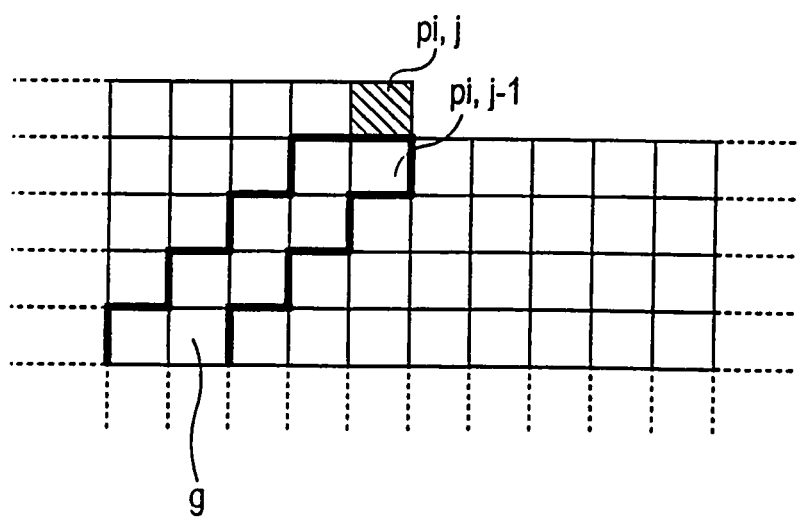
FIG. 22 is a diagram for describing an example of a group having extensity in a predetermined direction.

However, such as shown in FIG. 22, there may be a case where the group g to which the adjacent pixel p (a lower-adjacent pixel pi, j−1 in FIG. 22) is a group having an expanse in a predetermined direction (a direction extending from the lower left to the upper right in FIG. 22) on the reference image T. In such a case, in the same way as the above, the inclination of the distance direction (Z-axis direction) as to the predetermined direction of the distribution of each point is calculated by projecting and plotting each point on real space corresponding to each pixel belonging to the group g on a plane including the predetermined direction and the Z axis.

Subsequently, an arrangement may be made wherein based on this inclination, the distance Zp of a point P on real space corresponding to the adjacent pixel p is estimated, and when difference between the estimated distance Zp, and the distance Zi, j on real space corresponding to the pixel of interest pi, j is less than the above threshold, and accordingly, these are close, the pixel of interest pi, j and the adjacent pixel p are grouped, and when these are separated the threshold or more, the pixel of interest pi, j and the adjacent pixel p are not grouped.

Note that the above Technique 1 and Technique 2 may be applied to not only a case where the distance Zp on real space corresponding to the adjacent pixel p has not been calculated, but also a case where this has been calculated.

Also, in the case of the above Technique 2, in the event that difference ΔZ between the maximum value Zmax and the minimum value Zmin of each distance Z on real space corresponding to each pixel belonging to the group g to which the adjacent pixel p belongs is equal to or smaller than a predetermined threshold, i.e., small, or in the event that dispersion σz of each distance Z on real space corresponding to each pixel is equal to or smaller than a predetermined threshold, i.e., small, each point on real space corresponding to each pixel belonging to the group g has generally the same distance Z from the imaging means 2.

In such a case, the inclination θ of the distance direction (Z-axis direction) as to the horizontal direction (X-axis direction) of the distribution of each point (see FIG. 20), and the inclination φ of the distance direction as to the height direction (Y-axis direction) (see FIG. 21) are almost 0, and in such a case, determination can be made with sufficient precision whether or not the pixel of interest pi, j and the adjacent pixel p are grouped using the above Technique 1 or the like.

Accordingly, in the event that difference ΔZ between the maximum value Zmax and the minimum value Zmin of each distance Z on real space corresponding to each pixel belonging to the group g to which the adjacent pixel p belongs, or dispersion σz of each distance Z is equal to or smaller than a predetermined threshold, an arrangement is made so as not to execute the above Technique 2 to prevent the inclination θ or φ or the like from being calculated, and accordingly, computation load at the processing means 6 can be reduced, and speeding up of the processing can be realized.

Further, when executing the determination processing in steps S9, S10, and S13 in FIG. 4, in the event that an arrangement is made wherein at each time thereof the processing means 6 obtain the maximum value Zmax and the minimum value Zmin of each distance Z on real space corresponding to each pixel belonging to the group g to which the adjacent pixel p belongs, or calculate the dispersion σz of each distance Z, the computation load at the processing means 6 increase markedly.

Therefore, with the processing in steps S16 and S17 in FIG. 4, when the average-value calculating means 7 calculate and update the average value Dave of the image data D of each pixel belonging to a group registered as a new group, the group g enlarged by the pixel of interest pi, j being added, or the group g grouped into a single group by multiple groups being grouped, at the same time, an arrangement may be made wherein the distance Zi, j on real space corresponding to the pixel of interest pi, j is calculated, the dispersion σz of each distance Z on real space corresponding to each pixel belonging to the group g is calculated and updated, and also the maximum value Zmax and the minimum value Zmin of the distance Z on real space corresponding to each pixel belonging to the group g is updated as appropriate.

Also, at this time, an arrangement may be made wherein the average value Zave of the distance Z on real space thereof is calculated, the distance Zi, j on real space corresponding to the pixel of interest pi, j, and the average value Zave, the maximum value Zmax, and the minimum value Zmin of the distance Z on real space calculated regarding the group g to which the adjacent pixel p belongs are compared, and in the case that the difference thereof is equal to or greater than a predetermined threshold, the pixel of interest pi, j and the adjacent pixel p are not grouped.

On the other hand, an arrangement may be made wherein, based on the information of the road surface on real space detected by the road surface detecting means 16, determination is made whether to execute grouping by imposing further severe conditions. In this case, for example, an arrangement may be made so as to execute the determination processing by the following techniques.

Technique 3: First, the height Y of each point on real space corresponding to each pixel is calculated based on the each distance Z on real space corresponding to each pixel belonging to the group g. Subsequently, height Y-Y* from the road surface of each point is calculated based on the height Y* of the road surface at the distance Z detected by the road surface detecting means 16, and in the event that the height Y-Y* thereof is equal to or higher than a predetermined threshold, the group g is recognized as a solid object existing on the road surface. Also, in the event that the height is less than a predetermined threshold, the group g is recognized as a pattern such as a lane line, lane marking, or the like, indicated on the road surface.

As shown in FIG. 19B, the height Y* of the road surface at the distance Z on real space can be obtained by executing linear interpolation as to the lane line model shown in the above Expressions (13) and (14) for each section, or the like. Also, with regard to the lane line model to be used, in the event that the lane line model in this sampling cycle has been detected by the road surface detecting means 16, this lane line model is used, otherwise based on the lane line model detected in the previous sampling cycle the lane line model in this sampling cycle is estimated from the subsequent behavior of the vehicle, and is used.

Also, the threshold of the height from the road surface is set to a value, for example, such as 10 cm or the like from the road surface based on the detection precision of the lane line model according to the image processing device 1, the detection precision of the disparity dp of each pixel of the reference image T, or the like. Also, there is a case where the height Y-Y* from the road surface of a point on real space corresponding to a pixel is calculated as a negative value, and in this case, the point thereof is handled assuming that it exists on the road surface.

Technique 4: In the case that the height Y-Y* from the road surface of each point on real space corresponding to each pixel belonging to the group g to which the adjacent pixel p belongs is equal to or higher than the above predetermined threshold, and the height Yi, j-Y* from the road surface of a point on real space corresponding to the pixel of interest (single pixel) pi, j is lower than the predetermined threshold, or conversely, in the case that the height Y-Y* from the road surface of each point on real space corresponding to each pixel belonging to the group g to which the adjacent pixel p belongs is lower than the predetermined threshold, and the height Yi, j-Y* from the road surface of a point on real space corresponding to the pixel of interest pi, j is equal to or higher than the predetermined threshold, the pixel of interest pi, j and the adjacent pixel p are not grouped.

Thus, an arrangement is made wherein in the case that the pixel of interest pi, j and the adjacent pixel p, one of these is recognized as a solid object existing on the road surface, and the other is recognized as a pattern indicated on the road surface, these are not grouped, whereby a region where a part of the solid object existing on the road surface, and a region where a part of the pattern indicated on the road surface can accurately be divided and extracted on the reference image T even in the event that difference of the image data D between the adjacent pixels is insignificant, and division is not readily carried out with only the difference of the image data D.

Incidentally, with the present embodiment as well, upon noise or the like entering the reference image T, for example, a region to be extracted as a single region corresponding to a single imaged object imaged within the reference image T may be divided into multiple regions due to noise thereof or the like.

Therefore, with the present embodiment, for example, in the case that of the groups detected within the reference image T, with two distributions of each point on real space corresponding to each pixel belonging to two groups g1 and g2 that are not adjacent to each other on the reference image T, intervals on real space between a point belonging to one of the distributions and a point belonging to the other distribution are searched exhaustively, the minimum value thereof is equal to or smaller than a predetermined threshold, and the maximum value thereof is equal to or smaller than a predetermined threshold that is a greater value than that threshold, these two groups g1 and g2 may be arranged to be integrated into the single group g.

However, at this time, in the case that of the two groups g1 and g2 that are not adjacent to each other on the reference image T, the height Y-Y* from the road surface of each point on real space corresponding to each pixel belonging to one of the groups is higher than the predetermined threshold according to Technique 3 or Technique 4, and this group is recognized as a solid object existing on the road surface, and the height Y-Y* from the road surface of each point on real space corresponding to each pixel belonging to the other group is lower that the predetermined threshold, and this group is recognized as a pattern such as a lane line, lane marking, or the like, indicated on the road surface, these two groups are preferably arranged so as not to be integrated.

In the event that an arrangement is made such as described above, in the case that a region to be originally extracted as a single region corresponding to a single imaged object is divided into multiple regions due to influence such as noise or the like entering the reference image T, this is accurately restored, and accordingly, regions within the reference image T where a single object is imaged can accurately be integrated into a single region and this single region can be extracted, and also a solid object existing on the road surface, and a pattern indicated on the road surface can accurately be separated and extracted.

What is claimed is:

1. An image processing device configured to divide an image imaged by imaging means into a plurality of regions, said image processing device comprising:
   processing means configured to group, in a case that a difference of pieces of image data between a single pixel within said image and a pixel adjacent thereto is less than a predetermined first threshold, said single pixel and said adjacent pixel, and to divide said image into a plurality of regions with finally obtained each group as each region of said image; and
   average-value calculating means configured to calculate an average value of said image data within said group including said single pixel;
   wherein said processing means compares the image data of said single pixel, and an average value calculated at said average-value calculating means regarding said group to which said adjacent pixel belongs to, and
   wherein in a case that the difference thereof is equal to or greater than a predetermined second threshold, do not group said single pixel and said adjacent pixel.

2. The image processing device according to claim 1, wherein, with said processing means, upon the image data of said single pixel being transmitted from said imaging means, said image data of a pixel adjacent to said single pixel that comprises a pixel transmitted prior to said single pixel, of a same image as said single pixel, is compared with the image data of said single pixel, and the image data of said single pixel is compared with said average value of said group to which said adjacent pixel of which said image data was transmitted prior to said single pixel belongs to.

3. The image processing device according to claim 1, wherein, with said processing means, in a case that one of pieces of image data of adjacent said pixels are within a predetermined numeric value range, said adjacent pixels of which said image data is within said numeric value range are grouped in a preferred manner regardless of a comparison of pieces of image data between said single pixel and said adjacent pixels, and a comparison between the image data of said single pixel and said average value of said group.

4. The image processing device according to claim 1, wherein, with said processing means, in a case that, of pieces of the image data of adjacent said pixels, one piece of image data is within a predetermined numeric value range, and another piece of image data is out of said predetermined numeric value range, said adjacent pixels are not grouped regardless of a comparison of pieces of image data between said single pixel and said adjacent pixels, and a comparison between the image data of said single pixel and said average value of said group.

5. The image processing device according to claim 1, wherein, with said processing means, in a case that a minimum value of pixel intervals of two said groups that are not adjacent to each other on an image is equal to or smaller than a predetermined threshold, and a difference of average values of the two groups is equal to or smaller than a predetermined threshold, the two groups are integrated into a single group.

6. The image processing device according to claim 1, wherein said imaging means configured to output a pair of images comprises:
   distance detecting means configured to subject said pair of images output from said imaging means to stereo matching processing to detect distance on a real space corresponding to at least a pixel of one image of said pair of images;
   wherein, with said processing means, in a case that difference between said distance on a real space corresponding to said single pixel within said one image, and said distance on real space corresponding to a pixel adjacent to said single pixel is equal to or greater than a predetermined threshold, said single pixel and said adjacent pixel are not grouped.

7. The image processing device according to claim 6, wherein said processing means determines whether a difference between said distance on a real space closest to said distance on a real space corresponding to said single pixel of said distance on real space corresponding to each pixel belonging to said group to which said adjacent pixel belongs, and said distance on a real space corresponding to said single pixel is equal to or greater than said threshold.

8. The image processing device according to claim 6, wherein said processing means calculates coordinates of each point on real space corresponding to said each pixel based on said each distance on a real space corresponding to each pixel belonging to said group that said adjacent pixel belongs, calculates the inclination of the distribution of said each point, and determines whether a difference between a distance on a real space corresponding to said adjacent pixel estimated from said inclination, and said distance on real space corresponding to said single pixel is equal to or greater than said threshold.

9. The image processing device according to claim 6, wherein said average-value calculating means calculates one of an average value, a maximum value, and a minimum value of said each distance on a real space corresponding to each pixel belonging to said group;
   and wherein said processing means compares one of an average value, a maximum value, and a minimum value of said distance on a real space calculated at said average-value calculating means regarding said group to which said adjacent pixel belongs to with said distance on a real space corresponding to said single pixel, and in a case that a difference thereof is equal to or greater than a predetermined threshold, do not group said single pixel and said adjacent pixel.

10. The image processing device according to claim 6, further comprising:
   road surface detecting means configured to detect a road surface from an image imaged by said imaging means;
   wherein said processing means calculates a height of each point on a real space corresponding to said each pixel based on said each distance on a real space corresponding to each pixel belonging to said group, and in a case that a height of said each point from said road surface that said road surface detecting means detected is equal to or higher than a predetermined threshold, recognizes said group as a solid object existing on a road surface, and in a case that a height of said each point from said road surface that said road surface detecting means detected is lower than said predetermined threshold, recognizes said group as a pattern indicated on a road surface.

11. The image processing device according to claim 10, wherein, with said processing means, in a case that of a height from said road surface on a point on a real space corresponding to said single pixel, and a height from said road surface of said each point on a real space corresponding to each pixel belonging to said group to which said adjacent pixel belongs, one height is lower than said predetermined threshold, and another height is equal to or higher than said predetermined threshold, said single pixel and said adjacent pixel are not grouped.

12. The image processing device according to claim 6, wherein, with said processing means, in a case that, with two distributions of each point on a real space corresponding to each pixel belonging to two said groups that are not adjacent to each other on an image, a minimum value of an interval of two points on a real space belonging to a different distribution is equal to or smaller than a predetermined threshold, and in a case that a maximum value is equal to or smaller than a predetermined threshold that is a greater value than said threshold, the two groups are integrated into a single group.

13. The image processing device according to claim 6, wherein, with said processing means, in a case that, of two said groups that are not adjacent to each other on an image, a height from said road surface of said each point on real space corresponding to each pixel belonging to one of said groups is equal to or greater than said predetermined threshold, and in a case that a height from said road surface of said each point on real space corresponding to each pixel belonging to another of said groups is lower than said predetermined threshold, the two groups are not integrated.

* * * * *